United States Patent
Umebayashi

(10) Patent No.: US 10,563,075 B2
(45) Date of Patent: Feb. 18, 2020

(54) ACTINIC RAY-CURABLE-TYPE INKJET INK COMPOSITION FOR 3D PRINTING, THREE-DIMENSIONAL MODELING METHOD, AND ACTINIC RAY-CURABLE-TYPE INKJET INK SET FOR 3D PRINTING

(71) Applicant: FUJIFILM Corporation, Tokyo (JP)

(72) Inventor: Tsutomu Umebayashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 334 days.

(21) Appl. No.: 15/599,476

(22) Filed: May 19, 2017

(65) Prior Publication Data

US 2017/0252971 A1 Sep. 7, 2017

Related U.S. Application Data

(63) Continuation of application No. PCT/JP2015/084378, filed on Dec. 8, 2015.

(30) Foreign Application Priority Data

Dec. 16, 2014 (JP) ................. 2014-254280

(51) Int. Cl.
| | | |
|---|---|---|
| *C08F 2/46* | (2006.01) | |
| *C08F 2/50* | (2006.01) | |
| *C08G 61/04* | (2006.01) | |
| *C09D 11/38* | (2014.01) | |
| *B33Y 70/00* | (2020.01) | |
| *B29C 67/00* | (2017.01) | |
| *B41M 5/00* | (2006.01) | |
| *C09D 11/34* | (2014.01) | |
| *B29C 64/112* | (2017.01) | |
| *C09D 11/101* | (2014.01) | |
| *C09D 11/40* | (2014.01) | |
| *B33Y 10/00* | (2015.01) | |
| *B29K 33/00* | (2006.01) | |
| *B29K 105/00* | (2006.01) | |

(52) U.S. Cl.
CPC ............ *C09D 11/38* (2013.01); *B29C 64/112* (2017.08); *B29C 67/00* (2013.01); *B33Y 70/00* (2014.12); *B41M 5/00* (2013.01); *C09D 11/101* (2013.01); *C09D 11/34* (2013.01); *C09D 11/40* (2013.01); *B29K 2033/00* (2013.01); *B29K 2105/0002* (2013.01); *B29K 2105/0032* (2013.01); *B33Y 10/00* (2014.12)

(58) Field of Classification Search
CPC ....... B29C 67/00; B29C 64/112; C09D 11/38; C09D 11/40; C09D 11/34; C09D 11/101; B33Y 70/00; B33Y 10/00; B29K 2105/0032; B29K 2033/00; B29K 2105/0002

USPC .................. 522/6, 189, 184, 71, 1; 520/1
See application file for complete search history.

(56) References Cited

U.S. PATENT DOCUMENTS

| | | | |
|---|---|---|---|
| 7,851,122 B2 | 12/2010 | Napadensky | |
| 7,893,127 B2 | 2/2011 | Nagvekar et al. | |
| 8,940,813 B2 | 1/2015 | Araki et al. | |
| 9,101,955 B2 | 8/2015 | Araki et al. | |
| 2008/0090931 A1* | 4/2008 | Nagvekar | C09D 4/00 522/114 |
| 2013/0234370 A1 | 9/2013 | Suzuki et al. | |
| 2013/0295342 A1 | 11/2013 | Araki et al. | |
| 2015/0344709 A1* | 12/2015 | Araki | B29C 37/0032 428/195.1 |

FOREIGN PATENT DOCUMENTS

| | | |
|---|---|---|
| JP | 2012-111226 | 6/2012 |
| JP | 2013227515 | 11/2013 |
| JP | 2013237834 | 11/2013 |
| WO | 2008045517 | 4/2008 |

OTHER PUBLICATIONS

"Written Opinion of the International Searching Authority (Form PCT/ISA/237) of PCT/JP2015/084378", dated Feb. 16, 2016, with English translation thereof, pp. 1-8.
"International Search Report (Form PCT/ISA/210) of PCT/JP2015/084378", dated Feb. 16, 2016, with English translation thereof, pp. 1-4.
"Search Report of Europe Counterpart Application", dated Sep. 25, 2017, p. 1-p. 6.
"Office Action of Japan Counterpart Application," dated Jan. 16, 2018, with English translation thereof, p. 1-p. 12.

* cited by examiner

*Primary Examiner* — Jessica Whiteley
(74) *Attorney, Agent, or Firm* — JCIPRNET

(57) ABSTRACT

An actinic ray-curable-type inkjet ink composition for 3D printing includes an acrylate monomer A capable of forming a homopolymer having a glass transition temperature of from 25° C. to 120° C.; an acrylate monomer B capable of forming a homopolymer having a glass transition temperature of −60° C. or higher and lower than 25° C.; a bifunctional acrylate oligomer C having a weight-average molecular weight of from 2,000 to 20,000; and an acylphosphine oxide compound, in which the mass content of bifunctional or higher-functional acrylate compounds is 15% by mass or less.

10 Claims, No Drawings

ACTINIC RAY-CURABLE-TYPE INKJET INK COMPOSITION FOR 3D PRINTING, THREE-DIMENSIONAL MODELING METHOD, AND ACTINIC RAY-CURABLE-TYPE INKJET INK SET FOR 3D PRINTING

CROSS-REFERENCE TO RELATED APPLICATIONS

This application is a Continuation of PCT International Application No. PCT/JP2015/84378, filed on Dec. 8, 2015, which claims priority under 35 U.S.C. § 119(a) to Japanese Patent Application No. 2014-254280, filed on Dec. 16, 2014. Each of the above application(s) is hereby expressly incorporated by reference, in its entirety, into the present application.

BACKGROUND OF THE INVENTION

1. Field of the Invention

The present invention relates to an actinic ray-curable-type inkjet ink composition for 3D printing, a three-dimensional modeling method, and an actinic ray-curable-type inkjet ink set for 3D printing.

2. Description of the Related Art

An optical stereoscopic modeling method is a method of forming a stereoscopically modeled object having a desired shape by selectively conducting the supply of necessary energy to a photocurable composition.

As a representative example of the stereoscopic modeling method, the liquid surface of a photocurable composition contained in a container is selectively irradiated with light, for example, ultraviolet laser light, so as to obtain a cured layer having a desired pattern, and thus a cured layer is obtained. Next, the photocurable composition is supplied in a layer form on the cured layer, and then the photocurable composition is selectively irradiated with light in the same manner as described above so as to form a cured layer that is continued from the above-mentioned cured layer. The stereoscopic modeling method is a method of repeating this lamination operation, and thereby obtaining a finally desired stereoscopic three-dimensional modeled object. This stereoscopic modeling method is attracting public attention since an intended modeled object is obtained easily in a short period of time even in a case in which the shape of the modeled object to be produced is complicated.

Furthermore, in recent years, stereolithography methods based on an inkjet system have been proposed, and it has been enabled to perform stereolithography by curing a liquid photocurable resin discharged through an inkjet nozzle, and laminating the photocurable resin. Thus, there is an advantage that installation of a large-sized resin liquid tank or a dark room as in conventional cases is unnecessary. While stereolithography machines are compact and can be miniaturized, stereolithography methods are attracting attention as three-dimensional computer aided design (3D CAD), by which a stereoscopic model can be freely produced by using a CAD system.

Stereolithography methods of the related art include those methods described in JP2012-111226A and U.S. Pat. No. 7,851,122B.

SUMMARY OF THE INVENTION

The inventors of the present invention found that in a case in which a soft 3D modeled object is produced using a conventional soft modeling material by an inkjet system, there is a problem that the modeled object becomes very brittle, and the modeled object is destroyed during a process for removing a support material. Also, the inventors found that such a modeled object is also easily destroyed by stretching or bending.

An object to be solved by the invention is to provide an actinic ray-curable-type inkjet ink composition for 3D printing that gives a three-dimensional modeled object having excellent softness and tensile strength, a three-dimensional modeling method of using the inkjet ink composition, and an actinic ray-curable-type inkjet ink set for 3D printing including the inkjet ink composition.

The object described above has been achieved by the means described in the following items <1>, <9> or <10>. These means will be listed below together with preferred embodiments <2> to <8> and <11>.

<1> An actinic ray-curable-type inkjet ink composition for 3D printing, the inkjet ink composition comprising: an acrylate monomer A capable of forming a homopolymer having a glass transition temperature of from 25° C. to 120° C.; an acrylate monomer B capable of forming a homopolymer having a glass transition temperature of −60° C. or higher and lower than 25° C.; a bifunctional acrylate oligomer C having a weight-average molecular weight of from 2,000 to 20,000; and an acylphosphine oxide compound, wherein the mass content of bifunctional or higher-functional acrylate compounds with respect to the total amount of the ink composition is 15% by mass or less.

<2> The actinic ray-curable-type inkjet ink composition for 3D printing according to <1>, wherein the acrylate monomer A is a monofunctional acrylate compound.

<3> The actinic ray-curable-type inkjet ink composition for 3D printing according to <1> or <2>, wherein the acrylate monomer B is a monofunctional acrylate compound.

<4> The actinic ray-curable-type inkjet ink composition for 3D printing according to any one of <1> to <3>, wherein the acrylate oligomer C has a Young's modulus of 1 to 100 MPa.

<5> The actinic ray-curable-type inkjet ink composition for 3D printing according to any one of <1> to <4>, wherein the mass content MA of the acrylate monomer A and the mass content MB of the acrylate monomer B with respect to the total amount of the ink composition satisfy the relation: MA<MB.

<6> The actinic ray-curable-type inkjet ink composition for 3D printing according to any one of <1> to <5>, wherein the mass content MC of the acrylate oligomer C with respect to the total amount of the ink composition is from 1% by mass to 15% by mass.

<7> The actinic ray-curable-type inkjet ink composition for 3D printing according to any one of <1> to <6>, wherein the acrylate monomer A includes a monomer selected from the group consisting of isobornyl acrylate, t-butylcyclohexyl acrylate, 3,3,5-trimethylcyclohexyl acrylate, and dicyclopentanyl acrylate.

<8> The actinic ray-curable-type inkjet ink composition for 3D printing according to any one of <1> to <7>, wherein the acrylate monomer B includes a monomer selected from the group consisting of phenoxyethyl acrylate, n-stearyl acrylate, isodecyl acrylate, ethoxyethoxyethyl acrylate, tetrahydrofurfuryl acrylate, n-lauryl acrylate, n-octyl acrylate, n-decyl acrylate, isooctyl acrylate, n-tridecyl acrylate, and 2-(N-butylcarbamoyloxy)ethyl acrylate.

<9> A three-dimensional modeling method comprising: a heating step of heating an ink composition to a temperature in the range of 40° C. to 80° C.; a jetting step of jetting the heated ink composition from an inkjet head and forming an ink layer based on cross-sectional information of a three-dimensional modeled object; and a curing step of curing the ink layer with actinic rays, wherein the jetting step and the curing step are repeatedly carried out for 50 times or more, and at least the actinic ray-curable-type inkjet ink composition for 3D printing according to any one of <1> to <8> is used as the ink composition.

<10> An actinic ray-curable-type inkjet ink set for 3D printing, the ink set comprising: an ink composition for a modeling material; and an ink composition for a support material including a monofunctional acrylamide compound and/or a monofunctional acrylate compound having one or more hydroxyl groups, polyethylene glycol and/or polypropylene glycol, and a photopolymerization initiator, wherein the mass content of bifunctional or higher-functional acrylate compounds with respect to the total amount of the ink composition for a support material is 5% by mass or less, and the ink composition for a modeling material is the actinic ray-curable-type inkjet ink composition for 3D printing according to any one of <1> to <8>.

<11> The actinic ray-curable-type inkjet ink set for 3D printing according to <10>, wherein the monofunctional acrylamide compound included in the ink composition for a support material includes one or more compounds selected from the group consisting of hydroxyethyl acrylamide, isopropylacrylamide, acryloylmorpholine, and N,N-dimethylacrylamide, and the monofunctional acrylate compound having a hydroxyl group(s) included in the ink composition for a support material includes one or more compounds selected from the group consisting of polyethylene glycol monoacrylate, 4-hydroxybutyl acrylate, 2-hydroxyethyl acrylate, and 2-hydroxypropyl acrylate.

According to the invention, an actinic ray-curable-type inkjet ink composition for 3D printing that gives a three-dimensional modeled object having excellent softness and tensile strength, a three-dimensional modeling method of using the inkjet ink composition, and an actinic ray-curable-type inkjet ink set for 3D printing including the inkjet ink composition can be provided.

DESCRIPTION OF THE PREFERRED EMBODIMENTS

In the following description, the present invention will be described in detail. The description on constituent elements described below may be based on representative embodiments of the invention; however, the invention is not intended to be limited to those embodiments.

According to the invention, the description of "lower limit to upper limit" indicating a numerical value range represents "more than or equal to the lower limit, and less than or equal to the upper limit"; and the description of "upper limit to lower limit" represents "less than or equal to the upper limit, and more than or equal to the lower limit". That is, the descriptions represent numerical value ranges respectively including an upper limit and a lower limit.

Furthermore, in regard to a description of a group (atomic group) in the present specification, a description that does not indicate substitution or unsubstitution is meant to include a group that does not have a substituent, as well as a group having a substituent. For example, an "alkyl group" is meant to include an alkyl group that does not have a substituent (unsubstituted alkyl group) as well as an alkyl group that has a substituent (substituted alkyl group).

According to the invention, "percent (%) by mass" and "percent (%) by weight" have the same meaning, and "parts by mass" and "parts by weight" have the same meaning.

According to the invention, a combination of two or more preferred embodiments is a more preferred embodiment.

(Actinic Ray-Curable-Type Inkjet Ink Composition for 3D Printing)

The actinic ray-curable-type inkjet ink composition (hereinafter, also simply referred to as "ink composition") for 3D printing (also referred to as "three-dimensional modeling" or "3D printing") includes an acrylate monomer A capable of forming a homopolymer having a glass transition temperature of from 25° C. to 120° C.; an acrylate monomer B capable of forming a homopolymer having a glass transition temperature of −60° C. or higher and lower than 25° C.; a bifunctional acrylate oligomer C having a weight average molecular weight of from 2,000 to 20,000; and an acylphosphine oxide compound, in which the mass content of bifunctional or higher-functional acrylate compounds with respect to the total amount of the ink composition is 15% by mass or less.

The inventors of the present invention conducted a thorough investigation, and as a result, they found that in a case where the actinic ray-curable-type inkjet ink composition for 3D printing of the invention is used, a three-dimensional modeled object having both excellent softness and excellent tensile strength is obtained.

The term "3D printing" according to the invention means a printing method of forming a plurality of ink layers by laminating, in which 50 or more layers are laminated.

The specific mechanism by which the above-described effects are manifested is not clearly understood; however, it is speculated that in a case where the ink composition includes the acrylate monomer A, the acrylate monomer B, the acrylate oligomer C, and the particular photopolymerization initiator, and the amount of polyfunctional monomers is adjusted to a particular range, the effects are manifested concertedly.

The actinic ray-curable-type inkjet ink composition for 3D printing of the invention can be suitably used for applications such as, for example, medical three-dimensional modeled objects such as blood vessels, toys, and figurines.

The actinic ray-curable-type inkjet ink composition for 3D printing of the invention may be a colored ink composition including a colorant that will be described below, or may be a clear ink composition.

The "actinic ray" as used herein is not particularly limited as long as it is actinic ray that can apply energy capable of generating an initiating species in an ink composition in a case where the actinic ray is radiated, and actinic rays broadly include α-rays, γ-rays, X-rays, ultraviolet radiation (UV), visible light, and an electron beam. However, above all, from the viewpoints of curing sensitivity and easy availability, ultraviolet radiation and an electron beam are preferred, and ultraviolet radiation is particularly preferred. Therefore, the ink composition of the invention is preferably an ink composition that can be cured in a case where irradiated with ultraviolet radiation as actinic rays.

According to the invention, unless particularly stated otherwise, the term "acrylate" refers to both or any one of "acrylate" and "methacrylate", and the term "acrylic" refers to both or any one of "acrylic" and "methacrylic".

Specifically, for example, the acrylate monomer A may be an acrylate compound, or may be a methacrylate compound.

According to the invention, the glass transition temperature (Tg) of a homopolymer (monopolymer) of a monomer is measured using a dynamic viscoelasticity analyzer (DMA). The glass transition temperature of a homopolymer may vary depending on the degree of polymerization; however, in a case where a homopolymer having a weight-average molecular weight of 10,000 or more is produced and measured, the influence caused by the degree of polymerization can be neglected. In this invention, a value measured using a sample polymerized until the influence caused by the degree of polymerization can be neglected was designated as the glass transition temperature (Tg).

<Acrylate Monomer a Capable of Forming Homopolymer Having Glass Transition Temperature of from 25° C. to 120° C.>

The active ray-curable-type inkjet ink composition for 3D printing of the invention includes an acrylate monomer A that is capable of forming a homopolymer having a glass transition temperature of from 25° C. to 120° C.

The acrylate monomer A may be an acrylate compound, or may be a methacrylate compound; however, it is preferable that the acrylate monomer A is an acrylate compound.

The glass transition temperature of a homopolymer of the acrylate monomer A is from 25° C. to 120° C., preferably from 30° C. to 100° C., and more preferably from 60° C. to 100° C. In a case where the above-described embodiment is employed, the three-dimensional modeled object thus obtainable has superior softness and tensile strength, and the occurrence of failure at the time of removing the support material can be suppressed.

The acrylate monomer A may be a monofunctional acrylate monomer, or may be a polyfunctional acrylate monomer; however, the acrylate monomer A is preferably a monofunctional acrylate monomer.

It is also preferable that the acrylate monomer A is an acrylate monomer having a hydrocarbon ring structure.

Specific examples of the acrylate monomer A include isobornyl acrylate, isobornyl methacrylate, cyclohexyl acrylate, cyclohexyl methacrylate, t-butyl acrylate, t-butyl methacrylate, t-butylcyclohexyl acrylate, methyl methacrylate, ethyl methacrylate, propyl methacrylate, phenyl acrylate, phenyl methacrylate, benzyl acrylate, benzyl methacrylate, phenethyl acrylate, phenethyl methacrylate, dicyclopentanyl acrylate, 2-hydroxyethyl methacrylate, 2-methacryloyloxyethyl hexahydrophthalic acid, 3-hydroxypropyl methacrylate, 2-methacryloyloxyethyl phthalic acid, 3,3,5-trimethylcyclohexyl acrylate, 3,3,5-trimethylcyclohexyl methacrylate, dicyclopentenyl acrylate, and 1,6-hexanediol diacrylate.

Among these, it is preferable that the acrylate monomer A includes a monomer selected from the group consisting of isobornyl acrylate, t-butylcyclohexyl acrylate, 3,3,5-trimethylcyclohexyl acrylate, and dicyclopentanyl acrylate; and it is more preferable that the acrylate monomer A includes isobornyl acrylate and/or t-butylcyclohexyl acrylate. In a case where the above-described embodiment is employed, the three-dimensional modeled object thus obtainable has superior tensile strength, and the occurrence of failure at the time of removing the support material can be suppressed.

Regarding the acrylate monomer A, one kind of monomer may be incorporated, or two or more kinds of monomers may also be incorporated.

The mass content of the acrylate monomer A with respect to the total amount of the ink composition of the invention is preferably 1% to 30% by mass, more preferably 3% to 25% by mass, even more preferably 5% to 20% by mass, and particularly preferably 10% to 20% by mass. In a case where the mass content is in the range described above, the three-dimensional modeled object thus obtainable has superior softness and tensile strength, and the occurrence of failure at the time of removing the support material can be suppressed.

<Acrylate Monomer B Capable of Forming Homopolymer Having Glass Transition Temperature of −60° C. or Higher and Lower than 25° C.>

The actinic ray-curable-type inkjet ink composition for 3D printing of the invention includes an acrylate monomer B that is capable of forming a homopolymer having a glass transition temperature of −60° C. or higher and lower than 25° C.

The acrylate monomer B may be an acrylate compound, or may be a methacrylate compound; however, it is preferable that the acrylate monomer B is an acrylate compound.

The glass transition temperature of a homopolymer of the acrylate monomer B is −60° C. or higher and lower than 25° C., preferably from −30° C. to 10° C., and more preferably from −10° C. to 10° C. In a case where the above-described embodiment is employed, the three-dimensional modeled object thus obtainable has superior softness and tensile strength, and also has excellent formability.

Furthermore, the acrylate monomer B may be a monofunctional acrylate monomer, or may be a polyfunctional acrylate monomer; however, it is preferable that the acrylate monomer B is a monofunctional acrylate monomer.

It is also preferable that the acrylate monomer B is an acrylate monomer having an ether bond and/or an alkyl group having 8 or more carbon atoms.

Preferred examples of the acrylate monomer B include a long-chain alkyl (having 8 or more carbon atoms) acrylate compound, an acrylate compound having a polyethylene oxide or polypropylene oxide chain, and a phenoxyethyl acrylate compound.

Examples of the long-chain alkyl acrylate compound include 2-ethylhexyl acrylate, n-octyl acrylate, n-nonyl acrylate, n-decyl acrylate, isooctyl acrylate, n-lauryl acrylate, n-tridecyl acrylate, n-cetyl acrylate, n-stearyl acrylate, isomyristyl acrylate, and isostearyl acrylate.

Examples of the acrylate compound having a polyethylene oxide or polypropylene oxide chain include (poly)ethylene glycol monoacrylate, (poly)ethylene glycol acrylate methyl ester, (poly)ethylene glycol acrylate ethyl ester, (poly)ethylene glycol acrylate phenyl ester, (poly)propylene glycol monoacrylate, (poly)propylene glycol monoacrylate phenyl ester, (poly)propylene glycol acrylate methyl ester, (poly)propylene glycol acrylate ethyl ester, methoxy triethylene glycol acrylate, methoxy dipropylene glycol acrylate, ethoxy diethylene glycol acrylate(ethoxyethoxyethyl acrylate), and methoxy polyethylene glycol acrylate.

Examples of the phenoxyethyl acrylate compound include phenoxyethyl acrylate, phenoxy diethylene glycol acrylate, phenoxy polyethylene glycol acrylate, 2-hydoxy-3-phenoxypropyl acrylate, and an ethylene oxide adduct of nonylphenol acrylate.

Further preferred examples of the acrylate monomer B include tetrahydrofurfuryl acrylate and 2-(N-butylcarbamoyloxy)ethyl acrylate (1,2-ethanediol 1-acrylato 2-(N-butylcarbamate)) acrylate.

Among these, it is preferable that the acrylate monomer B includes a monomer selected from the group consisting of phenoxyethyl acrylate, n-stearyl acrylate, isodecyl acrylate, ethoxyethoxyethyl acrylate, tetrahydrofurfuryl acrylate, n-lauryl acrylate, n-octyl acrylate, n-decyl acrylate, isooctyl acrylate, n-tridecyl acrylate, and 2-(N-butylcarbamoyloxy) ethyl acrylate; and it is more preferable that the acrylate monomer B includes phenoxyethyl acrylate and/or n-stearyl acrylate. In a case where the above-described embodiment is employed, the three-dimensional modeled object thus obtainable has superior softness and tensile strength, and also has excellent formability.

Regarding the acrylate monomer B, one kind thereof may be incorporated, or two or more kinds thereof may also be incorporated.

The mass content of the acrylate monomer B with respect to the total amount of the ink composition of the invention is preferably 10% to 90% by mass, more preferably 30% to 85% by mass, even more preferably 40% to 80% by mass, and particularly preferably 50% to 75% by mass. In a case where the mass content is in the range described above, the three-dimensional modeled object thus obtainable has superior softness and tensile strength, and also has excellent formability.

Furthermore, it is preferable that the mass content MA of the acrylate monomer A and the mass content MB of the acrylate monomer B with respect to the total amount of the ink composition of the invention satisfy the relation: MA<MB (MA is smaller than MB); it is more preferable that MA and MB satisfy the relation: 2×MA<MB (the value obtained by doubling MA is smaller than MB); and it is even more preferable that MA and MB satisfy the relation: 3×MA<MB (the value obtained by tripling MA is smaller than MB). In a case where the above-described embodiment is employed, the three-dimensional modeled object thus obtainable has superior softness and tensile strength, and also has excellent formability.

It is also preferable that the relation: 10×MA>MB is satisfied (the value obtained by multiplying MA by 10 is larger than MB); it is more preferable that the relation: 7×MA>MB is satisfied (the value obtained by multiplying MA by 7 is larger than MB); and it is even more preferable that the relation: 5×MA>MB is satisfied (the value obtained by multiplying MA by 5 is larger than MB).

<Bifunctional Acrylate Oligomer C having Weight-Average Molecular Weight of from 2,000 to 20,000>

The actinic ray-curable-type inkjet ink composition for 3D printing of the invention includes a bifunctional acrylate oligomer C having a weight-average molecular weight of from 2,000 to 20,000.

The acrylate oligomer C may have an acryloyloxy group, or may have a methacryloyloxy group; however, it is preferable that the acrylate oligomer C has an acryloyloxy group.

The acrylate oligomer C is an oligomer having two units in total of an acryloyloxy group and/or a methacryloyloxy group. In a case where the ink composition includes only monofunctional acrylate oligomers, the three-dimensional modeled object thus obtainable has poor tensile strength, and in a case where the ink composition includes only trifunctional or higher-functional acrylate oligomers, the three-dimensional modeled object thus obtainable has poor softness.

The weight-average molecular weight (Mw) of the acrylate oligomer C is from 2,000 to 20,000, preferably from 5,000 to 20,000, and more preferably from 10,000 to 20,000. In a case where the above-described embodiment is employed, the three-dimensional modeled object thus obtainable has superior softness and tensile strength.

Regarding the method for measuring the weight-average molecular weight of the acrylate oligomer, the weight-average molecular weight is measured by performing a gel permeation chromatography (GPC) analysis.

More particularly, regarding the measurement conditions for GPC, HLC-8220 GPC of Tosoh Corporation is used, three TSK gel SuperAWM-H columns are connected and used, N-methylpyrrolidone (10 mM LiBr) is used as a solvent, and measurement is performed at a flow rate of 0.5 mL/min. Furthermore, the concentration of the sample is set to 0.1% by mass, the injection amount is set to 60 μL, and the measurement temperature is set to 40° C. Regarding the detector, an RI detector (differential refractometer) is used.

Young's modulus at 25° C. of the acrylate oligomer C is preferably 1 to 100 MPa, more preferably 2 to 80 MPa, even more preferably 3 to 50 MPa, and particularly preferably 10 to 30 MPa. In a case where the value of Young's modulus is in the range described above, the three-dimensional modeled object thus obtainable has superior softness and tensile strength.

Young's modulus at 25° C. of the acrylate oligomer C according to the invention is Young's modulus at 25° C. of a homopolymer (monopolymer) of the acrylate oligomer C.

The method for measuring Young's modulus at 25° C. according to the invention is carried out by the following method.

A liquid obtained by mixing 2% by mass of IRGACURE 819 (manufactured by BASF SE), 2% by mass of IRGACURE 184 (manufactured by BASF SE), and 96% by mass of the oligomer to be measured is applied with a bar coater to form a coating film having a thickness of 100 μm, and the coating film is cured in an ultraviolet (UV) exposure machine. At this time, the coating film was cured to the extent that the influence of the degree of polymerization of the cured film could be neglected. This cured film is cut into a short strip having a size of 15 mm×50 mm, and Young's modulus is measured using a tensile testing machine (AUTOGRAPH AGS-X 5KN, manufactured by Shimadzu Corporation). Furthermore, the value of Young's modulus is measured at a portion having an elongation of 1%. Furthermore, during the test, the sample was pulled in the longitudinal direction, and the parts extending for about 10 mm respectively from the top and the bottom were clamped.

The acrylate oligomer C is not particularly limited as long as it is, for example, an oligomer having two units in total of an acryloyloxy group and/or a methacryloyloxy group and having a Mw of from 2,000 to 20,000, and examples thereof include olefin-based oligomers (an ethylene oligomer, a propylene oligomer, a butene oligomer, and the like), vinyl-based oligomers (a styrene oligomer, a vinyl alcohol oligomer, a vinylpyrrolidone oligomer, an acrylic resin oligomer, and the like), diene-based oligomers (a butadiene oligomer, a chloroprene rubber, a pentadiene oligmer, and the like), ring-opened polymerized oligomers (di-, tri-, and tetraethylene glycol, polyethylene glycol, polyethylimine, and the like), polyaddition-based oligomers (an oligo ester acrylate, a polyamide oligomer, and a polyisocyanate oligomer), and addition-condensation oligomers (a phenolic resin, an amino resin, a xylene resin, a ketone resin, and the like).

Among these, an urethane acrylate oligomer, a polyester acrylate oligomer, or an epoxy acrylate oligomer is preferred; an urethane acrylate oligomer or an urethane acrylate oligomer having a polyester chain is more preferred; and a urethane acrylate oligomer is even more preferred.

Regarding the urethane acrylate oligomer, polyester acrylate oligomer, and epoxy acrylate oligomer, reference can be made to the Oligomer Handbook (reviewed by Furukawa, Junji; The Chemical Daily Co., Ltd.).

Also, regarding the acrylate oligomer C, products that are marketed by Shin Nakamura Chemical Co., Ltd., Sartomer Japan, Inc., Daicel-Cytec Co., Ltd., Rahn AG, and the like and meet the requirements described above can be used.

Regarding the acrylate oligomer C, one kind thereof may be incorporated, or two or more kinds thereof may also be incorporated.

The mass content MC of the acrylate oligomer C with respect to the total amount of the ink composition of the invention is preferably from 1% by mass to 15% by mass, more preferably from 3% by mass to 15% by mass, and even more preferably from 5% by mass to 15% by mass. In a case where the mass content is in the range described above, the three-dimensional modeled object thus obtainable has superior softness and tensile strength.

The mass content of bifunctional or higher-functional acrylate compounds with respect to the total amount of the ink composition of the invention is 15% by mass or less.

Among the bifunctional or higher-functional acrylate compounds in the ink composition of the invention, the proportion occupied by the acrylate oligomer C is preferably 50% by mass or more, more preferably 80% by mass or more, even more preferably 90% by mass or more, and particularly preferably 95% by mass or more, with respect to the total mass of the bifunctional or higher-functional acrylate compounds. In a case where the proportion is in the range described above, the three-dimensional modeled object thus obtainable has superior softness and tensile strength.

<Acylphosphine Oxide Compound Photopolymerization Initiator>

The actinic ray-curable-type inkjet ink composition for 3D printing of the invention includes an acylphosphine oxide compound (hereinafter, also referred to as "particular photopolymerization initiator"). In a case where the ink composition includes this particular photopolymerization initiator, the three-dimensional modeled object thus obtainable has excellent softness and tensile strength, and coloration derived from residue, decomposition products and the like of the photopolymerization initiator may be suppressed.

The acylphosphine oxide compound may be any of a monoacylphosphine oxide compound or a bisacylphosphine oxide compound; however, it is preferable that the acylphosphine oxide compound is a bisacylphosphine oxide compound.

It is preferable that the ink composition of the invention includes one or more kinds of acylphosphine oxide compounds and one or more kinds of α-hydroxy ketone compounds. In a case where the above-described embodiment is employed, the three-dimensional modeled object thus obtainable has superior softness and tensile strength.

Examples of the acylphosphine oxide compound include bis(2,4,6-trimethylbenzoyl)phenylphosphine oxide, bis(2,6-dimethylbenzoyl)phenylphosphine oxide, bis(2,4,6-trimethylbenzoyl)-2-methoxyphenylphosphine oxide, bis(2,6-dimethylbenzoyl)-2-methoxyphenylphosphine oxide, bis(2,4,6-trimethylbenzoyl)-2,4-dimethoxyphenylphosphine oxide, bis(2,6-dimethylbenzoyl)-2,4-dimethoxyphenylphosphineoxide, bis(2,4,6-trimethylbenzoyl)-2,4-dipentyloxyphenylphosphine oxide, bis(2,6-dimethylbenzoyl)-2,4-dipentyloxyphenylphosphine oxide, bis(2,6-dimethoxybenzoyl)-2,4,4-trimethylpentylphenylphosphine oxide, 2,4,6-trimethylbenzoylethoxyphenylphosphine oxide, 2,6-dimethylbenzoyleth oxyphenylphosphine oxide, 2,4,6-trimethylbenzoylmethoxyphenylphosphine oxide, 2,4,6-trimethylbenzoyldiphenylphosphine oxide, 2,6-dimethylbenzoylmethoxyphenylphosphine oxide, 2,4,6-trimethylbenzoyl(4-pentyloxyphenyl)phenylphosphine oxide, and 2,6-dimethylbenzoyl(4-pentyloxyphenyl)phenylphosphine oxide.

Examples of the α-hydroxy ketone compound include 1-[4-(2-hydroxyethoxy)-phenyl]-2-hydroxy-2-methyl-1-propan-1-one, 2-hydroxy-2-methyl-1-phenylpropan-1-one, and 1-hydroxycyclohexyl phenyl ketone.

Regarding the particular photopolymerization initiator, one kind thereof may incorporated, or two or more kinds thereof may also be incorporated.

The mass content of the photopolymerization initiator with respect to the total amount of the ink composition of the invention is preferably 1% to 20% by mass, more preferably 2% to 15% by mass, and even more preferably 5% to 15% by mass. In a case where the mass content is in the range described above, the three-dimensional modeled object thus obtainable has superior softness and tensile strength.

The ink composition of the invention may also include a compound that functions as a sensitizer (hereinafter, also simply referred to as "sensitizer"), in order to accelerate decomposition of the polymerization initiator by causing the photopolymerization initiator to absorb particular actinic energy rays.

Examples of the sensitizer include polynuclear aromatic compounds (for example, pyrene, perylene, triphenylene, and 2-ethyl-9,10-dimethoxyanthracene), xanthenes (for example, fluorescein, eosin, erythrosine, Rhodamine B, and Rose Bengal), cyanines (for example, thiacarbocyanine and oxacarbocyanine), merocyanines (for example, merocyanine and carbomerocyanine), thiazines (for example, thionine, Methylene Blue, and Toluidine Blue), acridines (for example, Acridine Orange, chloroflavine, and acriflavine), anthraquinones (for example, anthraquinone), squaryliums (for example, squarylium), coumarins (for example, 7-diethylamino-4-methylcoumarin), thioxanthones (for example, isopropylthioxanthone), and thiochromanones (for example, thiochromanone).

Among them, the sensitizer is preferably a thioxanthone compound, and more preferably isopropylthioxanthone.

Furthermore, the sensitizers may be used singly, or two or more kinds thereof may be used in combination.

The mass content of the sensitizer with respect to the total amount of the ink composition is preferably 0.1% to 5% by mass, and more preferably 0.5% to 3% by mass. In a case where the mass content is in the range described above, the ink composition has excellent curability and curing sensitivity.

<Colorant>

The ink composition of the invention may also include a colorant, as necessary.

The colorant that can be used herein is not particularly limited, and various known pigments and dyes can be appropriately selected and used according to the use. Among them, it is preferable that the colorant is a pigment, from the viewpoint of having particularly excellent light resistance.

The pigment that is preferably used for the invention will be discussed.

The pigment is not particularly limited, and all organic pigments and inorganic pigments that are generally commercially available, resin particles dyed with a dye, and the like can also be used. Furthermore, a commercially available pigment dispersion, a surface-treated pigment, for example, a pigment dispersed in an insoluble resin or the like as a dispersing medium, or a resin grafted to the surface of a pigment, and the like can also be used, as long as the effects of the invention are not impaired.

Examples of these pigments include the pigments described in Ito, Seijiro, ed., "Ganryo no Jiten (Dictionary of Pigments)" (year 2000); W. Herbst, K. Hunger, "Industrial Organic Pigments", JP2002-12607A, JP2002-188025A, JP2003-26978A, and JP2003-342503A.

Specific examples of the organic pigments and inorganic pigments that can be used for the invention include, for example, as pigments exhibiting yellow color, monoazo pigments such as C.I. Pigment Yellow 1 (First Yellow G or the like), and C.I. Pigment Yellow 74; disazo pigments such as C.I. Pigment Yellow 12 (Disazi Yellow AAA or the like), and C.I. Pigment Yellow 17; bibenzidine-based azo pigments such as C.I. Pigment Yellow 180; azo lake pigments such as C.I. Pigment Yellow 100 (Tartrazine Yellow Lake or the like); condensed azo pigments such as C.I. Pigment Yellow 95 (Condensed Azo Yellow GR or the like); acidic dye lake pigments such as C.I. Pigment Yellow 115 (Quinoline Yellow Lake or the like); basic dye lake pigments such as C.I. Pigment Yellow 18 (Thioflavine Lake or the like); anthraquinone-based pigments such as flavanthrone yellow (Y-24); isoindolinone pigments such as isoindolinone yellow 3RLT (Y-110); quinophthalone pigments such as quinophthalone yellow (Y-138); isoindoline pigments such as isoindoline yellow (Y-139); nitroso pigments such as C.I. Pigment Yellow 153 (Nickel Nitroso Yellow or the like); and metal complex salt azomethine pigments such as C.I. Pigment Yellow 117 (Copper Azomethine Yellow or the like).

Examples of pigments exhibiting red or magenta color include monoazo-based pigments such as C.I. Pigment Red 3 (Toluidine Red or the like); disazo pigments such as C.I. Pigment Red 38 (Pyrazolone Red B or the like); azo lake pigments such as C.I. Pigment Red 53:1 (Lake Red C or the like) and C.I. Pigment Red 57:1 (Brilliant Carmine 6B); condensed azo pigments such as C.I. Pigment Red 144 (Condensed Azo Red BR or the like); acidic dye lake pigments such as C.I. Pigment Red 174 (Phloxine B Lake or the like); basic pigment lake pigments such as C.I. Pigment Red 81 (Rhodamine 6G' Lake or the like); anthraquinone-based pigments such as C.I. Pigment Red 177 (Dianthraquinonyl Red or the like); thioindigo pigments such as C.I. Pigment Red 88 (Thioindigo Bordeaux or the like); perinone pigments such as C.I. Pigment Red 194 (Perinone Red or the like); perylene pigments such as C.I. Pigment Red 149 (Perylene Magenta or the like); quinacridone pigments such as C.I. Pigment Violet 19 (unsubstituted quinacridone) and C.I. Pigment Red 122 (Quinacridone Magenta or the like); isoindolinone pigments such as C.I. Pigment Red 180 (Isoindolinone Red 2BLT or the like); and alizarin lake pigments such as C.I. Pigment Red 83 (madder lake or the like).

Examples of pigments exhibiting blue or cyan color include disazo-based pigments such as C.I. Pigment Blue 25 (Dianisidine Blue or the like); phthalocyanine pigments such as C.I. Pigment Blue 15 (Phthalocyanine Blue or the like); acidic dye lake pigments such as C.I. Pigment Blue 24 (Peacock Blue lake or the like); basic dye lake pigments such as C.I. Pigment Blue 1 (Victoria Pure Blue BO lake or the like); anthraquinone-based pigments such as C.I. Pigment Blue 60 (Indanthrone Blue or the like); and alkali blue pigments such as C.I. Pigment Blue 18 (Alkali Blue V-5:1).

Examples of pigments exhibiting green color include phthalocyanine pigments such as C.I. Pigment Green 7 (Phthalocyanine Green) and C.I. Pigment Green 36 (Phthalocyanine Green); and azo metal complex pigments such as C.I. Pigment Green 8 (Nitroso Green).

Examples of pigments exhibiting orange color include isoindoline-based pigments such as C.I. Pigment Orange 66 (Isoindoline Orange); and anthraquinone-based pigments such as C.I. Pigment Orange 51 (Dichloropyranthrone Orange).

Examples of the pigment exhibiting black color include carbon black, titanium black, and aniline black.

Specific examples of white pigments that can be utilized include basic lead carbonate ($2PbCO_3Pb(OH)_2$, so-called Silver White), zinc oxide (ZnO, so-called Zinc White), titanium oxide ($TiO_2$, so-called Titanium White), and strontium titanate ($SrTiO_3$, so-called Titanium Strontium White).

Here, titanium oxide has a small specific weight and a large refractive index, and is chemically and physically stable, compared to other white pigments. Therefore, titanium oxide has high covering power or coloring power as a pigment, and also has excellent durability against acid, alkali, and other environments. Therefore, it is preferable to utilize titanium oxide as a white pigment. Of course, other white pigments (may be pigments other than those white pigments listed above) may also be used, as necessary.

For the dispersion of the colorant, for example, a dispersion apparatus such as a ball mill, a sand mill, an attriter, a roll mill, a jet mill, a homogenizer, a paint shaker, a kneader, an agitator, a Henschel mixer, a colloid mill, an ultrasonic homogenizer, a pearl mill, or a wet-type jet mill may be used.

In a case where dispersion of the colorant is performed, a dispersant such as a surfactant can be added.

Furthermore, on the occasion of adding a colorant, if necessary, it is also possible to use a synergist corresponding to various colorants, as a dispersing aid. It is preferable that the dispersing aid is added in an amount of 1 to 50 parts by mass with respect to 100 parts by mass of the colorant.

The colorant may be added directly together with various components on the occasion of preparing the ink composition. Also, for the reason of enhancing dispersibility, the colorant may be added to a dispersing medium such as a solvent or a monomer in advance, uniformly dispersing or dissolving the colorant therein, and then the resultant may mixed into the ink composition.

Regarding the dispersing medium for general components such as a colorant, a solvent may be added, or the above-mentioned polymerizable compound, which is a low molecular weight component, may also be used as a dispersing medium, without solvent. However, in order to cure the ink composition by irradiating the ink composition with actinic rays, it is preferable that no solvent is used. This is because in a case where there is residual solvent in the cured ink layer formed from a cured ink composition, solvent resistance may be deteriorated, or there may be a problem with the volatile organic compound (VOC) of the residual solvent. From this point of view, a monomer is used as a dispersing medium, and above all, it is preferable to select a monomer having the lowest viscosity, from the viewpoint of enhancing dispersion suitability or handleability of the ink composition.

The average particle size of the colorant used herein is preferably 0.01 to 0.4 μm, and more preferably 0.02 to 0.2 μm, since excellent color developability is obtained as the particles are finer. Selection of the colorant, the dispersant and the dispersing medium, and the conditions for dispersing and conditions for filtration are set such that the maximum particle size is preferably set to be 3 μm or less, and more preferably 1 μm or less. Through this management of particle size, clogging of the head nozzle can be suppressed, and preservation stability, transparency and curing sensitivity of the ink composition can be maintained. According to the invention, by using the above-mentioned dispersant having excellent dispersibility and stability, a uniform and stable dispersion is obtained even in a case in which a particulate colorant is used.

The particle size of the colorant can be measured by a known measurement method. Specifically, the particle size can be measured by a centrifugal sedimentation light transmission method, an X-ray transmission method, a laser diffraction scattering method, or a dynamic light scattering method. According to the invention, a value obtained by measurement using a laser diffraction/scattering method is employed.

In a case in which the ink includes a colorant, the mass content of the colorant with respect to the total amount of the ink composition is appropriately selected according to the color and the purpose of use; however, from the viewpoints of colorability and preservation stability, the mass content is preferably 0.01% to 40% by mass, more preferably 0.1% to 30% by mass, and particularly preferably 0.2% to 20% by mass.

<Dispersant>

The ink composition of the invention may also include a dispersant. Particularly in a case in which a pigment is used, it is preferable to incorporate a dispersant in order to stably disperse the pigment in the ink composition. The dispersant is preferably a polymer dispersant. The term "polymer dispersant" according to the invention refers to a dispersant having a weight-average molecular weight of 1,000 or more.

Examples of the polymer dispersant include DISPERBYK-101, DISPERBYK-102, DISPERBYK-103, DISPERBYK-106, DISPERBYK-111, DISPERBYK-161, DISPERBYK-162, DISPERBYK-163, DISPERBYK-164, DISPERBYK-166, DISPERBYK-167, DISPERBYK-168, DISPERBYK-170, DISPERBYK-171, DISPERBYK-174, and DISPERBYK-182 (manufactured by BYK Chemie GmbH); EFKA4010, EFKA4046, EFKA4080, EFKA5010, EFKA5207, EFKA5244, EFKA6745, EFKA6750, EFKA7414, EFKA745, EFKA7462, EFKA7500, EFKA7570, EFKA7575, and EFKA7580 (manufactured by EFKA Additive BV); DISPERSE AID 6, DISPERSE AID 8, DISPERSE AID 15, and DISPERSE AID 9100 (manufactured by San Nopco, Ltd.); various SOLSPERSE dispersants such as SOLSPERSE 3000, 5000, 9000, 12000, 13240, 13940, 17000, 22000, 24000, 26000, 28000, 32000, 36000, 39000, 41000, and 71000 (manufactured by Noveon, Inc.); ADEKA PLURONIC L31, F38, L42, L44, L61, L64, F68, L72, P95, F77, P84, F87, P94, L101, P103, F108, L121, and P-123 (manufactured by Adeka Corporation), IONET S-20 (manufactured by Sanyo Chemical Industries, Ltd.); DISPARLON KS-860, 873SN, and 874 (polymer dispersants), #2150 (aliphatic polyvalent carboxylic acid), and #7004 (polyether ester type) (manufactured by Kusumoto Chemicals, Ltd.).

The mass content of the dispersant with respect to the total amount of the ink composition is appropriately selected according to the purpose of use; however, the mass content is preferably 0.05% to 15% by mass.

<Surfactant>

Since the ink composition of the invention imparts stabilized jettability for a long period of time, it is preferable that the ink composition includes a surfactant.

Examples of the surfactant include those described in JP1987-173463A (JP-S62-173463A) and JP1987-183457A (JP-S62-183457A). Examples thereof include anionic surfactants such as dialkylsulfosuccinic acid salts, alkylnaphthalenesulfonic acid salts, and fatty acid salts; nonionic surfactants such as polyoxyethylene alkyl ethers, polyoxyethylene alkyl allyl ethers, acetylene glycols, and polyoxyethylene-polyoxypropylene block copolymers; and cationic surfactants such as alkylamine salts and quaternary ammonium salts. Furthermore, a fluorine-based surfactant (for example, an organic fluoro compound) or a silicone-based surfactant (for example, a polysiloxane compound) may also be used as the surfactant. It is preferable that the organic fluoro compound is hydrophobic. Examples of the organic fluoro compound include fluorine-based surfactants, oil-like fluorine-based compounds (for example, fluorine oil), and solid-like fluorine compound resins (for example, tetrafluoroethylene resin), and the compounds described in JP1982-9053B (JP-557-9053B, pages 8 to 17) and JP1987-135826A (JP-S62-135826A) may be mentioned.

It is preferable that the polysiloxane compound is a modified polysiloxane compound having an organic group into some of the methyl groups of dimethylpolysiloxane. Examples of the modification include polyether modification, methylstyrene modification, alcohol modification, alkyl modification, aralkyl modification, fatty acid ester modification, epoxy modification, amine modification, amino modification, and mercapto modification; however, the modification is not particularly limited to these. These methods for modification may also be used in combination. Among them, a polyether-modified polysiloxane compound is preferred from the viewpoint of improving jetting stability in inkjetting.

Examples of the polyether-modified polysiloxane compound include, for example, SILWET L-7604, SILWET L-7607 N, SILWET FZ-2104, and SILWET FZ-2161 (manufactured by NUC Corporation); BYK306, BYK307, BYK331, BYK333, BYK347, BYK348 and the like (manufactured by BYK Chemie GmbH); KF-351A, KF-352A, KF-353, KF-354L, KF-355A, KF-615A, KF-945, KF-640, KF-642, KF-643, KF-6020, X-22-6191, X-22-4515, KF-6011, KF-6012, KF-6015, and KF-6017 (manufactured by Shin-Etsu Chemical Co., Ltd.).

Among these, preferred examples of the surfactant are silicone-based surfactants, and a polysiloxane-based surfactant is more preferred, while a polydimethylsiloxane-based surfactant is even more preferred.

The content of the surfactant in the ink composition of the invention is appropriately selected depending on the purpose of use; however, the content is preferably 0.0001% to 3% by mass with respect to the total mass of the ink composition.

<Other Components>

The ink composition of the invention may also include other components in addition to the various components described above, as necessary.

Examples of the other components include a polymerization inhibitor, a photopolymerization initiator other than the particular photopolymerization initiator, a co-sensitizer, an ultraviolet absorber, an oxidation inhibitor, a discoloration inhibitor, a conductive salt, a solvent, a polymer compound, a basic compound, a leveling additive, a mattifying agent, and a polyester-based resin, a polyurethane-based resin, a vinyl-based resin, an acrylic resin, a rubber-based resin, and a wax, all for regulating the film properties. These are described in JP2009-185186A, and can also be used for this invention.

The ink composition of the invention may also include a monomer other than the acrylate monomer A, the acrylate monomer B, and the acrylate oligomer C.

Examples of the monomer other than the acrylate monomer A, the acrylate monomer B, and the acrylate oligomer C include a N-vinyl compound, a vinyl ether compound, a monofunctional acrylate compound that does not correspond to the acrylate monomer A and the acrylate monomer B, and a bifunctional or higher-functional acrylate compound that does not correspond to the acrylate monomer A and the acrylate monomer B and has a molecular weight or Mw of less than 2,000.

In a case in which the ink composition includes a monomer other than the acrylate monomer A, the acrylate monomer B, and the acrylate oligomer C, it is preferable that the mass content of the monomer with respect to the total amount of the ink composition is smaller than any of the mass content of the acrylate monomer A, the mass content of the acrylate monomer B, and the mass content of the acrylate oligomer C.

It is preferable that the ink composition of the invention includes a polymerization inhibitor, from the viewpoint of increasing storability.

In regard to inkjet recording, it is preferable that the ink composition is jetted out after the ink composition is heated in the range of 40° C. to 80° C. and made less viscous, and it is preferable that a polymerization inhibitor is added to the ink composition in order to prevent head clogging caused by thermal polymerization.

Examples of the polymerization inhibitor include a nitroso-based polymerization inhibitor, hydroquinone, methoxyhydroquinone, benzoquinone, p-methoxyphenol, TEMPO, TEMPOL (HO-TEMPO), cupferron Al, and a hindered amine.

Specific examples of the nitroso-based polymerization inhibitor that is preferably used for the invention will be described below; however, the examples are not limited to these.

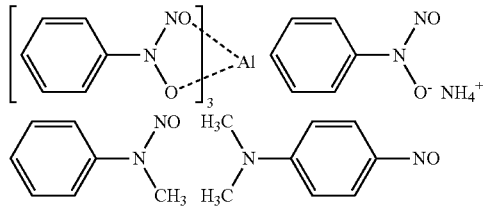

Commercially available products of the nitroso-based polymerization inhibitor include FIRSTCURE ST-1 (manufactured by Chem First, Inc.).

Commercially available products of the hindered amine-based polymerization inhibitor include TINUVIN 292, TINUVIN 770DF, TINUVIN 765, and TINUVIN 123.

Among them, the polymerization inhibitor is preferably at least one compound selected from the group consisting of cupferron Al (tris(N-nitroso-N-phenylhydroxylamine) aluminum salt, FIRSTCURE ST-1), methoxyhydroquinone, and HO-TEMPO (4-hydroxy-2,2,6,6-tetramethylpiperidinyloxy).

Regarding the polymerization inhibitor, one kind thereof may be included, or two or more kinds thereof may be included.

The mass content of the polymerization inhibitor with respect to the total amount of the ink composition of the invention is preferably 0.001% to 1.5% by mass, more preferably 0.01% to 1.0% by mass, and even more preferably 0.05% to 0.8% by mass. In a case where the mass content is in the range described above, polymerization during preparation and during storage of the ink composition can be suppressed, and clogging of inkjet nozzles can be prevented.

<Physical Properties of Ink Composition>

The viscosity at 25° C. of the ink composition of the invention is preferably 20 to 150 mPa·s, and more preferably 40 to 100 mPa·s. In a case where the viscosity is in the range described above, excellent jettability and moldability are obtained.

The viscosity of the ink composition or the like according to the invention is the viscosity obtained by maintaining the liquid temperature at 25° C. and measuring the value with a digital viscometer (DV-I PRIME, manufactured by Brookfield Engineering Laboratories, Inc.).

Furthermore, the surface tension at 25° C. of the ink composition of the invention is preferably 20 to 40 mN/m, and more preferably 20 to 30 mN/m. In a case where the surface tension is in the range described above, excellent jettability and moldability are obtained.

The surface tension of the ink composition or the like according to the invention is a value obtained by maintaining the liquid temperature at 25° C. and measuring the value using a surface tension meter (surface tension meter CBVP-Z, manufactured by Kyowa Interface Science Co., Ltd.).

(Actinic Ray-Curable-Type Inkjet Ink Set for 3D Printing)

The actinic ray-curable-type inkjet ink set for 3D printing of the invention (hereinafter, also simply referred to as "ink set") comprises an ink composition for a modeling material, and an ink composition for a support material, and the ink composition for a modeling material is the actinic ray-curable-type inkjet ink composition for 3D printing of the invention.

The ink set of the invention comprises an ink composition for a modeling material; and an ink composition for a support material, the ink composition for a support material including a monofunctional acrylamide compound and/or a monofunctional acrylate compound having one or more hydroxyl groups, polyethylene glycol and/or polypropylene glycol, and a photopolymerization initiator, in which the mass content of bifunctional or higher-functional acrylate compounds with respect to the total amount of the ink composition for a support material is 5% by mass or less, and the ink composition for a modeling material is preferably the actinic ray-curable-type inkjet ink composition for 3D printing of the invention.

Preferred embodiments of the ink composition for a modeling material for the ink set of the invention are the same as preferred embodiments of the actinic ray-curable-type inkjet ink composition for 3D printing of the invention described above.

The inkjet ink set of the invention may also have two or more kinds of ink compositions for a modeling material, or two or more kinds of ink compositions for a support material.

In a case in which the inkjet ink set of the invention has two or more kinds of ink compositions for a modeling material, it is preferable that the two or more kinds of ink compositions for a modeling material are both the actinic ray-curable-type inkjet ink compositions for 3D printing of the invention.

The "modeling material" refers to a material that becomes an intended modeled object by being cured. The "support material" refers to a material that is printed at the periphery or in the interior of a modeling material during a 3D printing process and supports the modeling material, and that is removed after modeling has been completed.

—Ink Composition for Support Material—

It is preferable that the ink composition for a support material that is used for the ink set of the invention includes a monofunctional acrylamide compound and/or a monofunctional acrylate compound having one or more hydroxyl groups, polyethylene glycol and/or polypropylene glycol, and a photopolymerization initiator, and the mass content of bifunctional or higher-functional acrylate compounds with respect to the total amount of the ink composition for a support material is 5% by mass or less.

It is preferable that the ink composition for a support material is an actinic ray-curable-type inkjet ink composition including a monomer and a photopolymerization initiator.

The ink composition for a support material is suitably used as a support material supporting an ink layer by being jetted out as needed at the periphery of the position at which the ink composition for a modeling material has been jetted out during 3D printing.

The ink composition for a support material used for the ink set of the invention is preferably such that the support material obtained by curing the ink composition can be easily removed, and it is more preferable that the support material obtained by curing the ink composition is a water-soluble cured product, and/or a crushable cured product having lower hardness than a cured modeling material.

It is preferable that the ink composition for a support material and the ink composition for a modeling material are mutually incompatible compositions. In a case where the above-described embodiment is employed, excellent moldability is obtained, and these two kinds of compositions may be cured simultaneously by irradiating the compositions with actinic rays.

In regard to the ink composition for a support material used for the invention, the mass content of bifunctional or higher-functional acrylate compounds with respect to the total amount of the ink composition for a support material is preferably 5% by mass or less, more preferably 2% by mass or less, and even more preferably 1% by mass or less, and it is particularly preferable that the ink composition for a support material does not include any bifunctional or higher-functional acrylate compound. In a case where the above-described embodiment is employed, the support material thus obtainable has excellent removability, and the occurrence of failure of the three-dimensional modeled object at the time of removing the support material thus obtainable can be suppressed.

<Monofunctional Acrylamide Compound and/or Monofunctional Acrylate Compound Having One or More Hydroxyl Groups>

It is preferable that the ink composition for a support material used for the invention includes a monofunctional acrylamide compound and/or a monofunctional acrylate compound having one or more hydroxyl groups. In a case where the above-described embodiment is employed, the support material thus obtainable has excellent removability, and the occurrence of failure of the three-dimensional modeled object at the time of removing the support material thus obtainable can be suppressed.

Furthermore, it is preferable that the mass content of the monofunctional acrylamide compound and the monofunctional acrylate compound having one or more hydroxyl groups with respect to the total amount of ethylenically unsaturated compounds in the ink composition for a support material used for the invention is 50% by mass or more, more preferably 80% by mass or more, even more preferably 90% by mass or more, and particularly preferably 95% by mass or more, and most preferably 100% by mass, that is, only a monofunctional acrylamide compound and/or a monofunctional acrylate compound having one or more hydroxyl groups as ethylenically unsaturated compounds for the ink composition for a support material. In a case where the above-described above embodiment is employed, the support material thus obtainable has excellent removability, and the occurrence of failure of the three-dimensional modeled object at the time of removing the support material thus obtainable can be suppressed.

Examples of the monofunctional acrylamide compound include acrylamide, N-methylacrylamide, N-ethylacrylamide, N-propylacrylamide, N-isopropylacrylamide, N-butylacrylamide, N,N-dimethylacrylamide, N,N-diethylacrylamide, N-hydroxyethyl acrylamide, N-hydroxypropyl acrylamide, N-hydroxybutyl acrylamide, acryloylmorpholine, methacrylamide, N-methylmethacrylamide, N-ethylmethacrylamide, N-propylmethacrylamide, N-isopropylmethacrylamide, N-butylmethacrylamide, N,N-dimethylmethacrylamide, N,N-diethylmethacrylamide, N-hydroxyethyl methacrylamide, N-hydroxypropyl methacrylamide, N-hydroxybutyl methacrylamide, and methacryloylmorpholine.

Among these, it is preferable that the monofunctional acrylamide compound includes a compound selected from the group consisting of N-hydroxyethyl acrylamide, N-isopropyl acrylamide, acryloylmorpholine, and N,N-dimethylacrylamide.

Examples of the monofunctional acrylate compound having one or more hydroxyl groups include hydroxyethyl acrylate, hydroxypropyl acrylate, 4-hydroxybutyl acrylate, polyethylene glycol monoacrylate, methoxy polyethylene glycol monoacrylate, polypropylene glycol monoacrylate, methoxy polypropylene glycol monoacrylate, monoacrylate of a polyethylene glycol/polypropylene glycol block polymer, hydroxyethyl methacrylate, hydroxypropyl methacrylate, 4-hydroxybutyl methacrylate, polyethylene glycol monomethacrylate, methoxy polyethylene glycol monomethacrylate, polypropylene glycol monomethacrylate, methoxy polypropylene glycol monomethacrylate, and monomethacrylate of a polyethylene glycol/polypropylene glycol block polymer.

Among these, it is preferable that the monofunctional acrylate compound having one or more hydroxyl groups includes a compound selected from the group consisting of polyethylene glycol monoacrylate, 4-hydroxybutyl acrylate, 2-hydroxyethyl acrylate, and 2-hydroxypropyl acrylate.

Regarding the monofunctional acrylamide compound, one kind of the acrylamide compound may be included, or two or more kinds thereof may be included. Regarding the monofunctional acrylate compound having one or more hydroxyl groups, one kind thereof may be included, or two or more kinds thereof may be included. It is also acceptable that the ink composition for a support material includes both a monofunctional acrylamide compound and a monofunctional acrylate compound having one or more hydroxyl groups.

The total mass content of the monofunctional acrylamide compound and the monofunctional acrylate compound having one or more hydroxyl groups with respect to the total amount of the ink composition for a support material is preferably 1% to 95% by mass, more preferably 3% to 50% by mass, and even more preferably 5% to 30% by mass. In a case where the total mass content is in the range described above, the occurrence of failure of the three-dimensional modeled object at the time of removing the support material thus obtained can be suppressed.

It is also preferable that the total mass content of the monofunctional acrylamide compound and the monofunctional acrylate compound having one or more hydroxyl groups with respect to the total amount of the ink composition for a support material is smaller than the mass content of polyethylene glycol and polypropylene glycol.

<Polyethylene Glycol and/or Polypropylene Glycol>

It is preferable that the ink composition for a support material used for the invention includes polyethylene glycol and/or polypropylene glycol; it is more preferable that the ink composition includes two or more kinds of polyethylene glycol and/or polypropylene glycol; and it is even more preferable that the ink composition includes one or more kinds of polyethylene glycol and one or more kinds of polypropylene glycol. In a case where the above-described embodiment is employed, the support material thus obtainable has excellent removability, and the occurrence of failure of the three-dimensional modeled object at the time of removing the support material thus obtained can be suppressed.

Furthermore, the number average molecular weight Mn of the polyethylene glycol and polypropylene glycol is preferably 100 to 5,000, and more preferably 150 to 3,000. In a case where the above-described embodiment is employed, excellent moldability is obtained, and the occurrence of failure of the three-dimensional modeled object at the time of removing the support material thus obtained can be suppressed.

Regarding the polyethylene glycol, one kind thereof may be included, or two or more kinds thereof may be included. Regarding the polypropylene glycol, one kind thereof may be included, or two or more kinds thereof may be included. The ink composition may also include both polyethylene glycol and polypropylene glycol.

The total mass content of polyethylene glycol and polypropylene glycol with respect to the total amount of the ink composition for a support material is preferably 10% to 98% by mass, more preferably 20% to 95% by mass, even more preferably 30% to 90% by mass, and particularly preferably 40% to 80% by mass. In a case where the total mass content is in the range described above, excellent moldability is obtained, and the occurrence of failure of the three-dimensional modeled object at the time of removing the support material thus obtained can be suppressed.

<Photopolymerization Initiator>

It is preferable that the ink composition for a support material used for the ink set of the invention includes a photopolymerization initiator.

The photopolymerization initiator is preferably a photo-radical polymerization initiator.

Examples of the photopolymerization initiator include (a) an aromatic ketone, (b) an acylphosphine oxide compound, (c) an aromatic onium salt compound, (d) an organic peroxide, (e) a thio compound, (f) a hexaarylbiimidazole compound, (g) a keto oxime ester compound, (h) a borate compound, (i) an azinidium compound, (j) a metallocene compound, (k) an active ester compound, (l) a compound having a carbon halogen bond, and (m) an alkylamine compound. In regard to these radical polymerization initiators, the compounds of (a) to (m) may be used singly or in combination. In regard to the details of the polymerization initiator, for example, those described in paragraphs 0090 to 0116 of JP2009-185186A may be mentioned as examples.

The photopolymerization initiators may be used singly, or two or more kinds thereof may be used in combination.

It is preferable that the ink composition for a support material includes two or more kinds of photopolymerization initiators; it is more preferable that the ink composition includes 3 to 5 kinds thereof; and it is even more preferable that the ink composition includes 3 kinds thereof.

Preferred examples of the photopolymerization initiator include an acylphosphine oxide compound, an α-hydroxy ketone compound, and/or an α-amino ketone compound. Among them, it is particularly preferable that the ink composition for a support material includes an acylphosphine oxide compound and an α-hydroxy ketone compound.

Regarding the acylphosphine oxide compound and the α-hydroxy ketone compound, known compounds can be used, and preferred examples include the compounds described above as particular photopolymerization initiators.

Regarding the α-amino ketone compound, known compounds can be used, and specifically, preferred examples thereof include 2-methyl-1-phenyl-2-morpholinopropan-1-one, 2-methyl-1-[4-(hexyl)phenyl]-2-morpholinopropan-1-one, 2-ethyl-2-dimethylamino-1-(4-morpholinophenyl)butan-1-one, 2-benzyl-2-dimethyl amino-1-(4-morpholinophenyl)butan-1-one, 2-methyl-1-(4-methylthiophenyl)-2-morpholiopropan-1-one), and 2-(dimethylamino)-2-[(4-methylphenyl)methyl]-1-[4-(4-morpholinyl)phenyl]-1-butanone.

Regarding the photopolymerization initiator used for the ink composition for a support material, it is preferable that the ink composition includes a water-soluble photopolymerization initiator.

For example, 1-[4-(2-hydroxyethoxy)phenyl]-2-hydroxy-2-methyl-1-propan-1-one is a water-soluble photopolymerization initiator, and this is a preferred example.

The mass content of the photopolymerization initiator with respect to the total amount of the ink composition for a support material is preferably 1% to 20% by mass, more preferably 2% to 15% by mass, and even more preferably 5% to 10% by mass. In a case where the mass content is in the range described above, excellent curability is obtained, and the occurrence of failure of the three-dimensional modeled object at the time of removing the support material thus obtained can be suppressed.

<Other Components>

The ink composition for a support material used for the invention may also include other components as necessary, in addition to the various components described above.

Examples of the other components include a polymerization inhibitor, a co-sensitizer, an ultraviolet absorber, an antioxidant, a discoloration preventor, a conductive salt, a solvent, water, a polymer compound, a basic compound, a leveling additive, a matting agent, and a polyester-based resin, a polyurethane-based resin, a vinyl-based resin, an acrylic resin, a rubber-based resin, and a wax, all intended for regulating the film properties. These are described in JP2009-185186A, and can also be used for this invention.

The ink composition for a support material may also include a monomer other than the monofunctional acrylamide compound and the monofunctional acrylate compound having one or more hydroxyl groups.

In a case in which the ink composition includes a monomer other than the monofunctional acrylamide compound and the monofunctional acrylate compound having one or more hydroxyl groups, it is preferable that the mass content of the monomer with respect to the total amount of the ink composition for a support material is smaller than the total mass content of the monofunctional acrylamide compound and the monofunctional acrylate compound having one or more hydroxyl groups. It is preferable that the mass content of the monomer is 5% by mass or less, more preferably 2% by mass or less, and even more preferably 1% by mass or less, with respect to the total amount of the ink composition for a support material, and it is particularly preferable that the ink composition does not include such a monomer.

From the viewpoint of increasing storability, the ink composition for a support material used for the invention includes a polymerization inhibitor.

Regarding the polymerization inhibitor, those compounds described above may be preferably used.

Regarding the polymerization inhibitor, one kind thereof may be included, or two or more kinds thereof may be included.

The mass content of the polymerization inhibitor with respect to the total amount of the ink composition for a support material is preferably 0.001% to 1.5% by mass, more preferably 0.01% to 1.0% by mass, and even more preferably 0.05% to 0.8% by mass. In a case where the mass content is in the range described above, polymerization at the time of preparation and at the time of storage of the ink composition for a support material can be suppressed, and clogging of inkjet nozzles can be prevented.

<Physical Properties of Ink Composition for Support Material>

The viscosity at 25° C. of the ink composition for a support material is preferably 20% to 150 mPa·s, and more preferably 40 to 100 mPa·s. In a case where the viscosity is in the range described above, excellent jettability and moldability are obtained.

The surface tension at 25° C. of the ink composition for a support material is preferably 20 to 40 mN/m, and more preferably 25 to 35 mN/m. In a case where the surface tension is in the range described above, excellent jettability and moldability are obtained.

There are no particular limitations on the method for producing the ink composition of the invention and the ink composition for a support material, and the ink compositions can be produced by mixing various components by known methods.

(Three-Dimensional Modeling Method)

The three-dimensional modeling method of the invention includes a heating step of heating an ink composition to a temperature in the range of 40° C. to 80° C.; a jetting step of jetting out the heated ink composition from an inkjet head, and forming an ink layer based on the cross-sectional information of a three-dimensional modeled object; and a curing step of curing the ink layer with actinic rays. The method is a method of repeatedly performing the jetting step and the curing step for 50 times or more, and using at least the actinic ray-curable-type inkjet ink composition for 3D printing of the invention as the ink composition described above.

Preferred embodiments of the actinic ray-curable-type inkjet ink composition for 3D printing of the invention in connection with the three-dimensional modeling method of the invention are the same as preferred embodiments of the actinic ray-curable-type inkjet ink composition for 3D printing of the invention described above.

Furthermore, in regard to the three-dimensional modeling method of the invention, it is preferable to use the actinic ray-curable-type inkjet ink composition for 3D printing of the invention as the ink composition for a modeling material.

In the three-dimensional modeling method of the invention, the actinic ray-curable-type inkjet ink composition for 3D printing of the invention may be used singly, or two or more kinds thereof may be used together.

Furthermore, the three-dimensional modeling method of the invention is preferably a three-dimensional modeling method according to a stereolithography method.

In the three-dimensional modeling method of the invention, it is also acceptable to further use an ink composition for a support material in addition to the ink composition of the invention as the ink composition described above.

Preferred embodiments of the ink composition for a support material according to the three-dimensional modeling method of the invention are the same as preferred embodiments of the ink composition for a support material for the ink set of the invention described above.

In the three-dimensional modeling method of the invention, a known inkjet jetting apparatus or a known inkjet jetting means can be used, and with any of these, jetting of the ink composition in the jetting step of the three-dimensional modeling method of the invention can be carried out.

<Heating Step>

It is preferable that the three-dimensional modeling method of the invention includes a heating step of heating an ink composition to a temperature in the range of 40° C. to 80° C.

There are no particular limitations on the heating means of the ink composition, and any known heating means can be used.

Regarding the heating means, a heating means that is furnished to an inkjet jetting apparatus used in the jetting step that will be described below may be suitably used. For example, a heating means performing thermal insulation and heating of from an ink composition supply tank to an inkjet head portion may be mentioned.

The method for temperature control is not particularly limited; however, it is preferable to control heating according to the flow rate of the ink composition and the environment temperature by providing a plurality of temperature sensors at various sites of the piping. The temperature sensors can be installed in the vicinity of an ink composition supply tank and in the vicinity of an inkjet head nozzle. It is also preferable that the head unit to be heated is thermally blocked or insulated so that the main body of the apparatus would not be affected by temperature from external air. In order to shorten the starting-up time of the inkjet jetting apparatus that requires heating, or in order to reduce the loss of heat energy, it is preferable to make the heat capacity of the entire heating unit small while achieving thermal insulation from other sites.

Furthermore, since an actinic ray-curable-type inkjet ink composition has higher viscosity than an aqueous ink composition that is generally used for inkjet jetting, the viscosity variation caused by temperature variation at the time of jetting is large. Since the viscosity variation of an ink composition significantly affects the change in the liquid droplet size and the change in the liquid droplet jetting speed and further causes deterioration in image quality, it is preferable to maintain the temperature of the ink composition at the time of jetting constant as far as possible. Therefore, according to the invention, it is adequate to set the controlled temperature range of the ink composition to be preferably ±5° C. from the preset temperature, more preferably ±2° C. from the preset temperature, and even more preferably ±1° C. from the preset temperature.

In regard to the three-dimensional modeling method of the invention, the aforementioned heating step may be carried out several times, or the heating means may be performed once, and the ink composition may be maintained at a temperature in the range of 40° C. to 80° C.

In regard to the three-dimensional modeling method of the invention, since it is preferable that the temperature of the ink composition at the time of being jetted from the inkjet head in the jetting step that will be described below is 40° C. to 80° C., it is preferable to perform a heating step again, or to maintain the temperature, so that the ink composition is maintained at a temperature in the range of 40° C. to 80° C.

<Jetting Step>

It is preferable that the three-dimensional modeling method of the invention includes a jetting step of jetting out the ink composition that has been heated by the heating step from an inkjet head, and forming an ink layer based on the cross-sectional information of a three-dimensional modeled object.

There are no particular limitations on the cross-sectional data of a three-dimensional modeled object used for the jetting step, and cross-sectional information corresponding to the three-dimensional shape of a desired three-dimensional modeled object may be produced in an any format adapted for the apparatus to be used. In regard to a method for producing cross-sectional information of a three-dimensional modeled object, for example, there may be mentioned a method of using three-dimensional CAD data of an object to be modeled; converting the CAD data to, for example, three-dimensional stereo lithography (STL) data as the data for three-dimensional modeling; and producing data for each cross-sectional body (layer) that has been sliced at a pitch (layer thickness) corresponding to the thickness of one ink layer in any single direction (for example, direction of height), from the three-dimensional STL data. This pitch can be appropriately determined in accordance with the ink composition to be used, desired accuracy, or the like. Furthermore, the data of each cross-sectional body (layer) may have the color information (chromatic data) of various parts, as necessary.

Furthermore, it is also possible to utilize the data and texture of a three-dimensional colored shape measured with a three-dimensional shape input device.

In regard to the jetting step, in a case in which an ink composition for a modeling material such as the ink composition of the invention, as well as an ink composition for a support material are used, it is needless to say that the "cross-sectional information of a three-dimensional modeled object" includes not only the cross-sectional information of the three-dimensional modeled object itself, but also the cross-sectional information of a support material provided at the time of forming the three-dimensional modeled object.

During the jetting step, as described above, an ink layer can be formed by jetting an ink composition from an inkjet head using a known inkjet jetting apparatus or an inkjet jetting means.

It is desirable that the ink composition that forms the ink layer includes at least the ink composition of the invention, and for example, in order to form a colored three-dimensional modeled object, it is preferable to use two or more kinds of the ink compositions of the invention, and it is preferable to use an ink composition for a support material in addition to the ink composition of the invention as necessary.

The ink layer that is formed of an ink composition for a support material may be formed into an any shape. For example, an ink layer may be formed of an ink composition for a support material such that a support material is formed into the minimum size that is necessary for forming the three-dimensional modeled object, or an ink layer may be formed of the ink composition for a support material with large margins so that a sufficient support material is formed at the periphery or in the interior of the three-dimensional modeled object.

Also, in a case where a support material is not needed for the formation of a three-dimensional modeled object having a desired shape, an ink composition for a support material may not be used.

The thickness of the ink layer in connection with the jetting step is not particularly limited, and as described above, the thickness may be determined in accordance with the ink composition to be used, desired accuracy, or the like. However, the thickness is preferably 0.1 to 200 μm, more preferably 1 to 150 μm, and even more preferably 10 to 100 μm.

The resolution of jetting of the ink composition by means of an inkjet head in connection the jetting step is not particularly limited, and the resolution can be appropriately selected in accordance with the accuracy of the desired three-dimensional modeled object, or the accuracy of the cross-sectional information of the three-dimensional modeled object.

The ink layer that is formed in the first jetting step according to the three-dimensional modeling method of the invention may be formed directly on the base of the three-dimensional modeling apparatus used or on a modeling table, or the ink layer may be formed on an any substrate, support or article that is separately prepared. Alternatively, the ink layer may also be formed on one layer or a plurality of layers of an ink composition for a support material provided by a method other than the method used in the jetting step.

It is preferable that the ink layers formed in the second and subsequent jetting steps in the three-dimensional modeling method of the invention are formed on the ink layer that has already been formed.

<Curing Step>

It is preferable that the three-dimensional modeling method of the invention includes a curing step of curing the ink layers formed by the jetting step with actinic rays.

Examples of the actinic rays that can be used for the curing step include α-rays, γ-rays, an electron beam, X-rays, ultraviolet radiation, visible light, and infrared light. The peak wavelength of the actinic rays may vary depending on the absorption characteristics of the photopolymerization initiator or the sensitizer; however, for example, the peak wavelength is preferably 200 to 600 nm, more preferably 300 to 450 nm, and even more preferably 320 to 420 nm, and it is particularly preferable that the actinic ray is ultraviolet radiation having a peak wavelength in the range of 340 to 400 nm.

The plane illuminance of exposure of the actinic rays for the curing step is preferably 10 to 4,000 mW/cm$^2$, and more preferably 20 to 2,500 mW/cm$^2$.

Regarding the actinic ray source, a mercury lamp, a gas or solid laser or the like is mainly utilized, and regarding the light source used for the curing of an ultraviolet-curable-type inkjet ink composition, a mercury lamp and a metal halide lamp are widely known. However, currently, from the viewpoint of environmental protection, removal of mercury is strongly desirable, and replacement with GaN-based semiconductor ultraviolet light emitting devices is very useful industrially and environmentally. Furthermore, LED (UV-LED) and LD (UV-LD) are small-sized, have long service lives, and are highly efficient and less expensive, and are therefore expected as potential light sources for photo-curable-type inkjetting.

It is also possible to use a light emitting diode (LED) and a laser diode (LD) as actinic ray sources. Particularly, in a case in which an ultraviolet light source is needed, an ultraviolet LED and an ultraviolet LD can be used. For example, Nichia Corporation is marketing a violet LED having a main emission spectrum in the wavelength range between 365 nm and 420 nm. Furthermore, in a case in which much shorter wavelengths are needed, U.S. Pat. No. 6,084,250B discloses a LED that can emit actinic rays centered between 300 nm to 370 nm. Other ultraviolet LED's are also available, and radiation of other ultraviolet bands may also be radiated. A particularly preferred actinic ray source according to the invention is a UV-LED, and a particularly preferred actinic ray source is a UV-LED having a peak wavelength at 340 to 400 nm.

The maximum illuminance of the LED on the ink layer is preferably 10 to 2,000 mW/cm$^2$, more preferably 20 to 1,000 mW/cm$^2$, and particularly preferably 50 to 800 mW/cm$^2$.

It is adequate that the ink layer is irradiated with actinic rays preferably for 0.01 to 120 seconds, and more preferably for 0.1 to 90 seconds.

According to the three-dimensional modeling method of the invention, the jetting step and the curing step are repeatedly carried out for 50 times or more. As one set of the jetting step and the curing step is repeated, a three-dimensional modeled object is formed layer by layer based on the cross-sectional information, and in the three-dimensional modeling method of the invention, 50 layers or more are formed. In a case where the number of repetitions is 50 times or more, the effect of softness according to the invention can be sufficiently obtained. From the viewpoint of further manifesting the effect of softness according to the invention, it is preferable that the thickness of the molded object is 1 mm or more, and more preferably 1 cm or more. Therefore, in regard to the three-dimensional modeling method of the invention, it is preferable that the jetting step and the curing step are performed repeatedly for 100 times or more, and it is more preferable that the jetting step and the curing step are performed repeatedly for 300 times or more.

While the jetting step and the curing step are repeated, the heating step may also be carried out again, as necessary.

Furthermore, as necessary, the three-dimensional modeling method may include a flattening step of flattening the surface of the ink layer using a roller or the like, between the jetting step and the curing step.

In a case in which an ink composition for a support material is used in combination as the ink composition, the three-dimensional modeling method of the invention includes a removal step of removing the support material formed as the ink composition for a support material has cured, from the three-dimensional modeled object thus obtained.

There are no particular limitations on the method for removing the support material, and the support material may be removed physically through pulverization or the like, or may be removed chemically through dissolution or the like.

For example, in a case where the support material is a crushable cured product having lower hardness compared to the modeling material, it is preferable to remove the support material physically through pulverization or the like. Also, in a case in which the support material is a water-soluble cured product, it is preferable to remove the support material by bringing the support material into contact with an aqueous liquid.

The three-dimensional modeling method of the invention may also include other known steps, as necessary.

If necessary, the three-dimensional modeling method of the invention may also include a post-treatment step such as cleaning, heat treatment, penetration of a resin or a wax, or polishing, for the three-dimensional modeled object thus obtained. The cleaning may involve elimination of the residue or the like of the support material remaining in the gaps by blowing or brushing the three-dimensional modeled object. The heat treatment may be carried out in accordance with the composition of the ink composition for a modeling material used or the like, in order to increase strength and durability of the three-dimensional modeled object. The permeation of wax reduces the void ratio, makes the three-dimensional modeled object water-resistant, can facilitate finishing by polishing, and can improve surface glossiness. The finishing by polishing can improve surface smoothness, and can improve the feeling of touch, glossiness, and the like.

The three-dimensional modeling method of the invention may also include a step of coloring the surface of the three-dimensional modeled object thus obtained, as necessary.

EXAMPLES

Hereinafter, the invention will be described in detail by way of Examples; however, the invention is not intended to be limited to these Examples.

Unless particularly stated otherwise in the following description, the unit "parts" represents "parts by mass", and the unit "percent (%)" represents "percent (%) by mass".

The Tg of a monomer in the following description refers to the glass transition temperature of a homopolymer of the monomer.

<Production of Pigment Dispersion>

Components of the respective compositions described in the following Table 1, except for the pigment, were mixed and stirred (10 to 15 minutes, and 2,000 to 3,000 rotations/min) with a mixer manufactured by Silverson Machines, Ltd., and thus a uniform transparent liquid (dilution of dispersant) was obtained. The pigment was added to this transparent liquid (dilution of dispersant), and the mixture was further stirred with a mixer (10 to 20 minutes, and 2,000 to 3,000 rotations/min). Thus, 500 parts of a uniform preliminary dispersion liquid was obtained. Subsequently, the preliminary dispersion liquid was subjected to a dispersion treatment using a circulation type beads mill apparatus manufactured by VMA-Getzmann GmbH (DISPERMAT SL-012C1). Regarding the dispersing conditions, 200 parts of zirconia beads having a diameter of 0.65 mm were introduced, and the circumferential speed was set to 15 m/s. The dispersing time was set to 1 to 6 hours.

TABLE 1

|  |  | White pigment dispersion 1 | Cyan pigment dispersion 1 | Magenta pigment dispersion 1 | Yellow pigment dispersion 1 |
|---|---|---|---|---|---|
| Pigment | 20 mass % | TiO$_2$ | PB15:4 | Mixed crystal quinacridone | PY155 |
| Dispersant | 10 mass % | Sol41000 | Sol32000 | Sol32000 | Sol32000 |

TABLE 1-continued

|  |  | White pigment dispersion 1 | Cyan pigment dispersion 1 | Magenta pigment dispersion 1 | Yellow pigment dispersion 1 |
|---|---|---|---|---|---|
| Polymerization inhibitor | 0.1 mass % | UV12 | UV12 | UV12 | UV12 |
| Monomer | Balance | PEA | PEA | PEA | PEA |

The details of the various compounds and abbreviations described in Table 1 are as follows.

PB15:4 (C.I. Pigment Blue 15:4, cyan pigment, HELIOGEN BLUE D 7110 F, manufactured by BASF SE)

Mixed crystal quinacridone (quinacridone-based mixed crystal pigment, magenta pigment, CINQUASIA MAGENTA L 4540, manufactured by BASF SE)

PY155 (C.I. Pigment Yellow 155, yellow pigment, INK JET YELLOW 4GC, manufactured by Clariant International AG)

$TiO_2$ (titanium oxide, white pigment, KRONOS 2300, manufactured by Kronos, Inc.)

Sol32000 (dispersant, SOLSPERSE 32000, manufactured by Lubrizol Corporation)

Sol41000 (dispersant, SOLSPERSE 41000, manufactured by Lubrizol Corporation)

UV12 (polymerization inhibitor, FLORSTAB UV-12, manufactured by Kromachem GmbH)

PEA (2-phenoxyethyl acrylate, Tg: 5° C., molecular weight: 192, SR339C, manufactured by Sartomer USA, LLC)

<Production of Ink Composition for Support Material>

Components of the respective compositions described in the following Table 2 were mixed and stirred (10 to 15 minutes, 2,000 to 3,000 rotations/min) with a mixer manufactured by Silverson Machines, Ltd., and thus a uniform transparent liquid (dilution of dispersant) was obtained. These liquids prepared as such were used as the ink compositions for a support material (support material) for Examples and Comparative Examples.

IBOA (isobornyl acrylate, Tg: 94° C., molecular weight: 208, SR506D, manufactured by Sartomer USA, LLC)

HDDA (1,6-hexanediol diacrylate, Tg: 43° C., molecular weight: 226, SR238, manufactured by Sartomer USA, LLC)

Polyethylene glycol (Mn=200) (Mn=200, manufactured by Tokyo Chemical Industry Co., Ltd.)

Polyethylene glycol (Mn=400) (Mn=400, manufactured by Tokyo Chemical Industry Co., Ltd.)

Polypropylene glycol (Mn=2,000, manufactured by Tokyo Chemical Industry Co., Ltd.)

Irgacure2959 (1-[4-(2-hydroxyethoxy)phenyl]-2-hydroxy-2-methyl-1-propan-1-one, photopolymerization initiator, manufactured by BASF SE)

Irgacure184 (1-hydroxycyclohexyl phenyl ketone, photopolymerization initiator, manufactured by BASF SE)

TPO (2,4,6-trimethylbenzoyldiphenylphosphine oxide, photopolymerization initiator, LUCIRIN TPO, manufactured by BASF SE)

OH-TEMPO (4-hydroxy-2,2,6,6-tetramethylpiperidin-1-oxyl free radical, polymerization inhibitor, manufactured by Adeka Corporation)

<Production of Ink Composition for Modeling Material (Modeling Material)>

Components of the respective compositions described in the following Table 3 to Table 8 were mixed and stirred (10 to 15 minutes, 2,000 to 3,000 rotations/min) with a mixer manufactured by Silverson Machines, Ltd., and thus a uniform transparent liquid (dilution of dispersant) was obtained. These liquids prepared as such were used as the

TABLE 2

|  | Support material 1 | Support material 2 | Support material 3 | Support material 4 | Support material 5 |
|---|---|---|---|---|---|
| Acryloylmorpholine | 20 | — | — | — | 20 |
| Polyethylene glycol monoacrylate | — | 20 | — | — | 20 |
| IBOA | — | — | 20 | — | 51.9 |
| HDDA | — | — | — | 20 | — |
| Polyethylene glycol (Mn = 200) | 51.9 | 51.9 | 51.9 | 51.9 | — |
| Polyethylene glycol (Mn = 400) | 10 | 10 | 10 | 10 | — |
| Polypropylene glycol | 10 | 10 | 10 | 10 | — |
| Irgacure2959 | 3 | 3 | 3 | 3 | 3 |
| Irgacure184 | 3 | 3 | 3 | 3 | 3 |
| TPO | 2 | 2 | 2 | 2 | 2 |
| OH-TEMPO | 0.1 | 0.1 | 0.1 | 0.1 | 0.1 |
| Total (parts by mass) | 100 | 100 | 100 | 100 | 100 |

The unit for the values in the columns for various components described in Table 2 is parts by mass.

The details of the various compounds and abbreviations described in Table 2 are shown below.

Acryloylmorpholine (ACMO, manufactured by Rahn AG)

Polyethylene glycol monoacrylate (number average molecular weight (Mn): 336, BISOMER™ MEPG 350 MA, manufactured by Laporte Performance Chemicals UK, Ltd.)

ink compositions for a modeling material (modeling material) for Examples and Comparative Examples.

Examples 1 to 18 and Comparative Examples 1 to 14

A commercially available 3D printer, OBJET260 CONNEX (manufactured by Stratasys, Ltd.), was filled with the support material 1 and a modeling material (Inks 1 to 32), and samples were molded using the respective inks by the method described below. Each of the samples was evaluated for moldability, shrinkage ratio, softness, strength, and the failure occurrence ratio caused by removal of the support material. On the occasion of producing a sample, processes of jetting out the modeling material and the support material 1 that had been heated to 70° C. from an inkjet head, thereby forming an ink layer based on the cross-sectional information of a three-dimensional modeled object, and curing the ink layer with actinic rays, were repeated for 300 times or more.

<Evaluation of Moldability>

A cube with each side having a length of 3 cm was produced, and the angle of vertex of each face of the cube thus obtained was measured. The results were evaluated according to the following evaluation standard. In regard to the production of the cube, the support material present at the periphery of the ink layers was removed using a knife.

Excellent 5: All the angles of vertex are less than 90±0.5 degrees.

Good 4: The largest error from 90 degrees is 0.5 degree or more and less than 1 degree.

Acceptable 3: The largest error from 90 degrees is 1 degree or more and less than 1.5 degrees.

Poor 2: The largest error from 90 degrees is 1.5 degrees or more and less than 2.0 degrees.

Very poor 1: The largest error from 90 degrees is 2.0 degrees or more.

<Evaluation of Shrinkage Ratio>

The difference between the density of the modeling material liquid and the density of the molded object (density difference) was calculated, and the results were evaluated according to the following evaluation standard. The densities of the modeling material liquid and the molded object were measured using an automatic dry type density meter (ACCUPYC II 1340 series, manufactured by Shimadzu Corporation). The density of the liquid was measured with about 1 g of a liquid sample, and the density of the molded object was measured with a sample that had been molded into a cube with each side measuring 8 mm. For the production of the cube, the support material present at the periphery of the ink layers was removed using a knife.

Excellent 5: The density difference is less than 3%.

Good 4: The density difference is 3% or more and less than 6%.

Acceptable 3: The density difference is 6% or more and less than 9%.

Poor 2: The density difference is 9% or more and less than 12%.

Very poor 1: The density difference is 12% or more.

<Evaluation of Softness>

A cube with each side having a length of 3 cm was produced, and softness of the cube thus obtained was measured as Durometer hardness (Type A) using a durometer (GS-779G, Teclock Corporation), and the softness was evaluated based on the measured values according to the following evaluation standard. In regard to the production of the cube, the support material present at the periphery of the ink layers was removed using a knife. The measurement of softness was performed by placing a cube with each side having a length of 3 cm on a horizontal stand, and making measurement while pressing the durometer from the top face of the laminate.

Excellent 5: 0 or more and less than 30

Good 4: 30 or more and less than 50

Acceptable 3: 50 or more and less than 70

Poor 2: 70 or more and less than 90

Very poor 1: 90 or more

<Evaluation of Strength>

A plate-shaped sample having a size of 2 mm×10 mm×80 mm was produced, and a tensile test (AUTOGRAPH AGS-X 5KN, manufactured by Shimadzu Corporation) was performed using the plate-shaped sample thus obtained. Thus, tensile strength was measured and was evaluated according to the following standard. In regard to the production of the plate-shaped sample, the support material present at the periphery of the ink layers was removed using a knife. The plate-shaped sample was molded such that the direction of longer length would be horizontal to the stand. Furthermore, during the test, a short strip having a size of 2 mm×10 mm×80 mm was pulled in the longitudinal direction, and the parts extending for about 10 mm respectively from the top and the bottom were clamped.

Excellent 5: Tensile strength is 30 N or more.

Good 4: Tensile strength is 25 N or more and less than 30 N.

Acceptable 3: Tensile strength is 20 N or more and less than 25 N.

Poor 2: Tensile strength is 15 N or more and less than 20 N.

Very poor 1: Tensile strength is less than 15 N.

<Evaluation of Failure Occurrence Ratio Caused by Removal of Support Material>

A tube-shaped sample having an inner diameter of 10 mm, an outer diameter of 11 mm, a thickness of 1 mm, and a length of 5 cm was modeled, and the support material was removed using a water spray system for support material removal installed on OBJET260 CONVEX. For the tube thus obtained, the failure occurrence ratio such as tear-off was investigated.

Meanwhile, the tube-shaped sample was formed such that the direction of longer length would be horizontal to the stand. The removal of the support material was achieved by spraying water from all directions, and this was continued until the support material was removed. A time period of about 10 minutes on the average was required.

Excellent 5: Failure occurred 0 times in ten times of modeling.

Good 4: Failure occurred 1 time in ten times of modeling.

Acceptable 3: Failure occurred 2 times in ten times of modeling.

Poor 2: Failure occurred 3 times in ten times of modeling.

Very poor 1: Failure occurred 4 times or more in ten times of modeling.

TABLE 3

|  | Example 1 Ink 1 | Example 2 Ink 2 | Example 3 Ink 3 | Example 4 Ink 4 | Example 5 Ink 5 |
|---|---|---|---|---|---|
| Monomer A | IBOA 15 mass % | IBOA 15 mass % | IBOA 15 mass % | IBOA 5 mass % | IBOA 30 mass % |
| Monomer B | PEA 65 mass % | PEA 70 mass % | PEA 60 mass % | PEA 75 mass % | PEA 50 mass % |

TABLE 3-continued

|  | Example 1 Ink 1 | Example 2 Ink 2 | Example 3 Ink 3 | Example 4 Ink 4 | Example 5 Ink 5 |
| --- | --- | --- | --- | --- | --- |
| Oligomer C | CN996 10 mass % | CN996 5 mass % | CN996 15 mass % | CN996 10 mass % | CN996 10 mass % |
| Irg184 | 7.8 mass % | 7.8 mass % | 7.8 mass % | 7.8 mass % | 7.8 mass % |
| Irg819 | 2.0 mass % | 2.0 mass % | 2.0 mass % | 2.0 mass % | 2.0 mass % |
| BYK307 | 0.1 mass % | 0.1 mass % | 0.1 mass % | 0.1 mass % | 0.1 mass % |
| UV1 | 0.1 mass % | 0.1 mass % | 0.1 mass % | 0.1 mass % | 0.1 mass % |
| Moldability | 5 | 4 | 5 | 5 | 5 |
| Shrinkage ratio | 5 | 5 | 4 | 5 | 5 |
| Softness | 5 | 5 | 3 | 5 | 3 |
| Strength | 5 | 3 | 5 | 3 | 5 |
| Failure occurrence ratio | 5 | 3 | 5 | 3 | 5 |

TABLE 4

|  | Example 6 Ink 6 | Example 7 Ink 7 | Comparative Example 1 Ink 8 | Comparative Example 2 Ink 9 | Comparative Example 3 Ink 10 | Example 8 Ink 11 |
| --- | --- | --- | --- | --- | --- | --- |
| Monomer A | TMCHA 15 mass % | DPCA 15 mass % | TCDDMDA 5 mass % | IBOA 15 mass % | IDA 15 mass % | IBOA 15 mass % |
| Monomer A | — | — | — | TMCHA 65 mass % | — | — |
| Monomer B | PEA 65 mass % | PEA 65 mass % | PEA 80 mass % | PEA 65 mass % | PEA 65 mass % | C18 alkyl acrylate 65 mass % |
| Oligomer C | CN996 10 mass % | CN996 10 mass % | CN996 5 mass % | CN996 10 mass % | CN996 10 mass % | CN996 10 mass % |
| Irg184 | 7.8 mass % | 7.8 mass % | 7.8 mass % | 7.8 mass % | 7.8 mass % | 7.8 mass % |
| Irg819 | 2.0 mass % | 2.0 mass % | 2.0 mass % | 2.0 mass % | 2.0 mass % | 2.0 mass % |
| BYK307 | 0.1 mass % | 0.1 mass % | 0.1 mass % | 0.1 mass % | 0.1 mass % | 0.1 mass % |
| UV1 | 0.1 mass % | 0.1 mass % | 0.1 mass % | 0.1 mass % | 0.1 mass % | 0.1 mass % |
| Moldability | 5 | 5 | 4 | 5 | 4 | 5 |
| Shrinkage ratio | 5 | 5 | 4 | 5 | 5 | 5 |
| Softness | 5 | 4 | 1 | 1 | 5 | 4 |
| Strength | 4 | 5 | 3 | 5 | 1 | 5 |
| Failure occurrence ratio | 4 | 5 | 3 | 5 | 1 | 5 |

TABLE 5

|  | Comparative Example 4 Ink 12 | Example 9 Ink 13 | Example 10 Ink 14 | Example 11 Ink 15 | Example 12 Ink 16 |
| --- | --- | --- | --- | --- | --- |
| Monomer A | IBOA 15 mass % | IBOA 15 mass % | IBOA 15 mass % | IBOA 15 mass % | IBOA 15 mass % |
| Monomer B | DEG EA 65 mass % | IDA 65 mass % | PEA 65 mass % | PEA 65 mass % | PEA 65 mass % |
| Oligomer C | CN996 10 mass % | CN996 10 mass % | CN704 10 mass % | CN962 10 mass % | CN965 10 mass % |
| Irg184 | 7.8 mass % | 7.8 mass % | 7.8 mass % | 7.8 mass % | 7.8 mass % |
| Irg819 | 2.0 mass % | 2.0 mass % | 2.0 mass % | 2.0 mass % | 2.0 mass % |
| BYK307 | 0.1 mass % | 0.1 mass % | 0.1 mass % | 0.1 mass % | 0.1 mass % |
| UV1 | 0.1 mass % | 0.1 mass % | 0.1 mass % | 0.1 mass % | 0.1 mass % |
| Moldability | 3 | 3 | 5 | 5 | 5 |
| Shrinkage ratio | 5 | 5 | 5 | 5 | 5 |
| Softness | 5 | 5 | 5 | 5 | 4 |
| Strength | 1 | 3 | 4 | 5 | 5 |
| Failure occurrence ratio | 4 | 5 | 5 | 5 | 5 |

TABLE 6

|  | Comparative Example 5 Ink 17 | Comparative Example 6 Ink 18 | Comparative Example 7 Ink 19 | Comparative Example 8 Ink 20 | Example 13 Ink 21 | Comparative Example 9 Ink 22 |
| --- | --- | --- | --- | --- | --- | --- |
| Monomer A | IBOA | IBOA | IBOA | IBOA | IBOA | IBOA |
|  | 15 mass % | 15 mass % | 15 mass % | 15 mass % | 15 mass % | 15 mass % |
| Monomer B | PEA | PEA | PEA | PEA | PEA | PEA |
|  | 65 mass % | 65 mass % | 65 mass % | 65 mass % | 65 mass % | 65 mass % |
| Oligomer C | CN2505 | CN991 | CN710 | CN989 | UV3000B | UV3700B |
|  | 10 mass % | 10 mass % | 10 mass % | 10 mass % | 10 mass % | 10 mass % |
| Irg184 | 7.8 mass % | 7.8 mass % | 7.8 mass % | 7.8 mass % | 7.8 mass % | 7.8 mass % |
| Irg819 | 2.0 mass % | 2.0 mass % | 2.0 mass % | 2.0 mass % | 2.0 mass % | 2.0 mass % |
| BYK307 | 0.1 mass % | 0.1 mass % | 0.1 mass % | 0.1 mass % | 0.1 mass % | 0.1 mass % |
| UV1 | 0.1 mass % | 0.1 mass % | 0.1 mass % | 0.1 mass % | 0.1 mass % | 0.1 mass % |
| Moldability | 5 | 5 | 5 | 5 | 4 | 3 |
| Shrinkage ratio | 3 | 5 | 5 | 5 | 5 | 5 |
| Softness | 1 | 2 | 5 | 1 | 5 | 5 |
| Strength | 5 | 5 | 1 | 5 | 4 | 2 |
| Failure occurrence ratio | 5 | 5 | 1 | 5 | 4 | 2 |

TABLE 7

|  | Comparative Example 10 Ink 23 | Comparative Example 11 Ink 24 | Example 14 Ink 25 | Example 15 Ink 26 | Example 16 Ink 27 | Example 17 Ink 28 |
| --- | --- | --- | --- | --- | --- | --- |
| Monomer A | TCDDMDA | TMPTA | IBOA | IBOA | IBOA | IBOA |
|  | 10 mass % | 15 mass % | 15 mass % | 15 mass % | 15 mass % | 15 mass % |
| Monomer B | ADA | PEA | PEA | PEA | PEA | PEA |
|  | 10 mass % | 65 mass % | 60 mass % | 60 mass % | 60 mass % | 60 mass % |
| Monomer | C18 alkyl acrylate | — | — | — | — | — |
|  | 60 mass % |  |  |  |  |  |
| Oligomer C | CN996 | CN996 | CN996 | CN996 | CN996 | CN996 |
|  | 10 mass % | 10 mass % | 10 mass % | 10 mass % | 10 mass % | 10 mass % |
| Pigment dispersion | — | — | White pigment dispersion 1 | Cyan pigment dispersion 1 | Magenta pigment dispersion 1 | Yellow pigment dispersion 1 |
|  | — | — | 5 mass % | 5 mass % | 5 mass % | 5 mass % |
| Irg184 | 7.8 mass % | 7.8 mass % | 7.8 mass % | 7.8 mass % | 7.8 mass % | 7.8 mass % |
| Irg819 | 2.0 mass % | 2.0 mass % | 2.0 mass % | 2.0 mass % | 2.0 mass % | 2.0 mass % |
| BYK307 | 0.1 mass % | 0.1 mass % | 0.1 mass % | 0.1 mass % | 0.1 mass % | 0.1 mass % |
| UV1 | 0.1 mass % | 0.1 mass % | 0.1 mass % | 0.1 mass % | 0.1 mass % | 0.1 mass % |
| Moldability | 5 | 5 | 4 | 4 | 4 | 4 |
| Shrinkage ratio | 2 | 1 | 5 | 5 | 5 | 5 |
| Softness | 1 | 1 | 5 | 5 | 5 | 5 |
| Strength | 5 | 5 | 4 | 4 | 4 | 4 |
| Failure occurrence ratio | 5 | 5 | 4 | 4 | 4 | 4 |

TABLE 8

|  | Comparative Example 12 Ink 29 | Comparative Example 13 Ink 30 | Example 18 Ink 31 | Example 19 Ink 32 | Example 20 Ink 33 | Example 21 Ink 34 |
| --- | --- | --- | --- | --- | --- | --- |
| Monomer A | IBOA | IBOA | IBOA | IBOA | IBOA | IBOA |
|  | 15 mass % | 15 mass % | 15 mass % | 15 mass % | 15 mass % | 15 mass % |
| Monomer B | PEA | PEA | PEA | PEA | PEA | PEA |
|  | 65 mass % | 65 mass % | 65 mass % | 73 mass % | 72.8 mass % | 69.8 mass % |
| Monomer | PEG400DA | — | — | — | — | — |
|  | 10 mass % |  |  |  |  |  |
| Oligomer C | — | CN996 | CN996 | CN996 | CN996 | CN996 |
|  | — | 10 mass % | 10 mass % | 10 mass % | 10 mass % | 10 mass % |
| Irg184 | 7.8 mass % | 7.8 mass % | — | — | — | — |
| Irg819 | 2.0 mass % | — | — | 1.8 mass % | 2.0 mass % | 5 mass % |
| Irg907 | — | 2.0 mass % | — | — | — | — |
| Irg2959 | — | — | 4.0 mass % | — | — | — |
| TPO | — | — | 5.8 mass % | — | — | — |

TABLE 8-continued

| | Comparative Example 12 Ink 29 | Comparative Example 13 Ink 30 | Example 18 Ink 31 | Example 19 Ink 32 | Example 20 Ink 33 | Example 21 Ink 34 |
|---|---|---|---|---|---|---|
| BYK307 | 0.1 mass % | 0.1 mass % | 0.1 mass % | 0.1 mass % | 0.1 mass % | 0.1 mass % |
| UV1 | 0.1 mass % | 0.1 mass % | 0.1 mass % | 0.1 mass % | 0.1 mass % | 0.1 mass % |
| Moldability | 5 | 1 | 5 | 3 | 4 | 5 |
| Shrinkage ratio | 3 | Moldability was poor, and evaluation was not performed | 5 | 5 | 5 | 5 |
| Softness | 1 | | 5 | 4 | 4 | 4 |
| Strength | 5 | | 5 | 5 | 5 | 5 |
| Failure occurrence ratio | 5 | | 5 | 5 | 5 | 5 |

The details of the various compounds and abbreviations described in Table 3 to Table 8 in addition to those described above are as follows.

TMCHA (3,3,5-trimethylcyclohexyl acrylate, Tg: 27° C., molecular weight: 195, SR420, manufactured by Sartomer USA, LLC)

DCPA (dicyclopentanyl acrylate, Tg: 120° C., molecular weight: 204.3, FA513AS, manufactured by Hitachi Chemical Co., Ltd.)

TCDDMDA (tricyclodecanedimethanol diacrylate, Tg: 187° C., molecular weight: 304, SR833S, manufactured by Sartomer USA, LLC)

TMPTA (trimethylolpropane triacrylate, Tg: 62° C., molecular weight: 296, SR351, manufactured by Sartomer USA, LLC)

IDA (isodecyl acrylate, Tg: −60° C., molecular weight: 212, SR395, manufactured by Sartomer USA, LLC)

DEG EA (diethylene glycol monobutyl ether acrylate, Tg: −74° C., molecular weight: 216, CD278, manufactured by Sartomer USA, LLC)

C18 alkyl acrylate (stearyl acrylate, Tg: 9° C., molecular weight: 324, SR586, manufactured by Sartomer USA, LLC)

ADA (1-adamantyl acrylate, Tg: 153° C., molecular weight: 206.3, manufactured by Osaka Organic Chemical Industry, Ltd.)

CN704 (bifunctional polyester acrylate oligomer, Mw: 5,000, Young's modulus: 2 MPa, manufactured by Sartomer USA, LLC)

CN962 (bifunctional polyester acrylate oligomer, Mw: 5,550, Young's modulus: 14 MPa, manufactured by Sartomer USA, LLC)

CN996 (bifunctional urethane acrylate oligomer, Mw: 2,850, Young's modulus: 21 MPa, manufactured by Sartomer USA, LLC)

CN965 (bifunctional urethane acrylate oligomer having a polyester structure, Mw: 5,600, Young's modulus: 78 MPa, manufactured by Sartomer USA, LLC)

CN2505 (tetrafunctional polyester acrylate oligomer, Mw: 1,500, Young's modulus: 152 MPa, manufactured by Sartomer USA, LLC)

CN991 (bifunctional urethane acrylate oligomer having a polyester structure, Mw: 1,500, Young's modulus: 13 MPa, manufactured by Sartomer USA, LLC)

CN710 (monofunctional polyester acrylate oligomer, Mw: 5,000, Young's modulus: 0.2 MPa, manufactured by Sartomer USA, LLC)

CN989 (trifunctional urethane acrylate oligomer, Mw: 4,000, Young's modulus: 1,360 MPa, manufactured by Sartomer USA, LLC)

UV3000B (bifunctional urethane acrylate oligomer, Mw: 18,000, Young's modulus: 4 MPa, SHIKOH UV-3000B, manufactured by Nippon Synthetic Chemical Industry Co., Ltd.)

UV3700B (bifunctional urethane acrylate oligomer, Mw: 38,000, Young's modulus: 0.5 MPa, SHIKOH UV-3700B, manufactured by Nippon Synthetic Chemical Industry Co., Ltd.)

Irg184 (1-hydroxycyclohexyl phenyl ketone photopolymerization initiator, IRGACURE 184, manufactured by BASF SE)

Irg819 (bis(2,4,6-trimethylbenzoyl)phenylphosphine oxide, photopolymerization initiator, IRGACURE 819, manufactured by BASF SE)

BYK307 (polydimethylsiloxane-based surfactant, BYK-307, manufactured by BYK Chemie GmbH)

UV1 (polymerization inhibitor, FLORSTAB UV-1, manufactured by Kromachem GmbH)

Irg2959 (1-[4-(2-hydroxyethoxy)-phenyl]-2-hydroxy-2-methyl-1-propan-1-one, photopolymerization initiator, IRGACURE 2959, manufactured by BASF SE)

Irg907 (2-[4-(methylthio)benzoyl]-2-(4-morpholinyl)propane, α-amino ketone compound, photopolymerization initiator, IRGACURE 907, manufactured by BASF SE)

TPO (2,4,6-trimethylbenzoyldiphenylphosphine oxide, photopolymerization initiator, LUCIRIN TPO, manufactured by BASF SE)

PEG400DA (polyethylene glycol diacrylate, bifunctional, Tg: 39° C., molecular weight: 508, SR334, manufactured by Sartomer USA, LLC)

Examples 19 to 22

A commercially available 3D printer, OBJET260 CONNEX (manufactured by Stratasys, Ltd.), was filled with the support materials 2 to 5 and the modeling material (Ink 1) as described in Table 9, and the failure occurrence ratio caused by removal of the support material was evaluated. The evaluation results are summarized in Table 9.

TABLE 9

| | Example 19 | Example 20 | Example 21 | Example 22 |
|---|---|---|---|---|
| Modeling material | Ink 1 | Ink 1 | Ink 1 | Ink 1 |
| Support material | Support material 2 | Support material 3 | Support material 4 | Support material 5 |
| Failure occurrence ratio | 5 | 4 | 3 | 3 |

What is claimed is:
1. An actinic ray-curable-type inkjet ink composition for 3D printing, the ink composition comprising:
an acrylate monomer A capable of forming a homopolymer having a glass transition temperature of from 25° C. to 120° C.;

an acrylate monomer B capable of forming a homopolymer having a glass transition temperature of −60° C. or higher and lower than 25° C.;

a bifunctional acrylate oligomer C having a weight-average molecular weight of from 2,000 to 20,000; and an acylphosphine oxide compound, wherein the mass content of bifunctional or higher-functional acrylate compounds with respect to the total amount of the ink composition is 15% by mass or less, and the mass content MA of the acrylate monomer A and the mass content MB of the acrylate monomer B with respect to the total amount of the ink composition satisfy the relation: MA<MB.

2. The actinic ray-curable-type inkjet ink composition for 3D printing according to claim 1, wherein the acrylate monomer A is a monofunctional acrylate compound.

3. The actinic ray-curable-type inkjet ink composition for 3D printing according to claim 1, wherein the acrylate monomer B is a monofunctional acrylate compound.

4. The actinic ray-curable-type inkjet ink composition for 3D printing according to claim 1, wherein the acrylate oligomer C has a Young's modulus at 25° C. of 1 to 100 MPa.

5. The actinic ray-curable-type inkjet ink composition for 3D printing according to claim 1, wherein the mass content MC of the acrylate oligomer C with respect to the total amount of the ink composition is from 1% by mass to 15% by mass.

6. The actinic ray-curable-type inkjet ink composition for 3D printing according to claim 1, wherein the acrylate monomer A includes a monomer selected from the group consisting of isobornyl acrylate, t-butylcyclohexyl acrylate, 3,3,5-trimethylcyclohexyl acrylate, and dicyclopentanyl acrylate.

7. The actinic ray-curable-type inkjet ink composition for 3D printing according to claim 1, wherein the acrylate monomer B includes a monomer selected from the group consisting of phenoxyethyl acrylate, n-stearyl acrylate, isodecyl acrylate, ethoxyethoxyethyl acrylate, tetrahydrofurfuryl acrylate, n-lauryl acrylate, n-octyl acrylate, n-decyl acrylate, isooctyl acrylate, n-tridecyl acrylate, and 2-(N-butylcarbamoyloxy)ethyl acrylate.

8. A three-dimensional modeling method, comprising:

a heating step of heating an ink composition to a temperature in the range of 40° C. to 80° C.;

a jetting step of jetting the heated ink composition from an inkjet head, and forming an ink layer based on cross-sectional information of a three-dimensional modeled object; and a curing step of curing the ink layer with actinic rays, wherein the jetting step and the curing step are repeatedly carried out for 50 times or more, and at least the actinic ray-curable-type inkjet ink composition for 3D printing according to claim 1 is used as the ink composition.

9. An actinic ray-curable-type inkjet ink set for 3D printing, the ink set comprising:

an ink composition for a modeling material; and an ink composition for a support material, including a monofunctional acrylamide compound and/or a monofunctional acrylate compound having one or more hydroxyl groups, polyethylene glycol and/or polypropylene glycol, and a photopolymerization initiator, wherein the mass content of bifunctional or higher-functional acrylate compounds with respect to the total amount of the ink composition for a support material is 5% by mass or less, and the ink composition for a modeling material is the actinic ray-curable-type inkjet ink composition for 3D printing according to claim 1.

10. The actinic ray-curable-type inkjet ink set for 3D printing according to claim 9, wherein the monofunctional acrylamide compound included in the ink composition for a support material includes one or more compounds selected from the group consisting of hydroxyethyl acrylamide, isopropyl acrylamide, acryloylmorpholine, and N,N-dimethyl acrylamide, and the monofunctional acrylate compound having a hydroxyl group(s) included in the ink composition for a support material includes one or more compounds selected from the group consisting of polyethylene glycol monoacrylate, 4-hydroxybutyl acrylate, 2-hydroxyethyl acrylate, and 2-hydroxypropyl acrylate.

* * * * *